US012739217B2

(12) United States Patent
Chan et al.

(10) Patent No.: US 12,739,217 B2
(45) Date of Patent: Sep. 15, 2026

(54) GENERATING EDITABLE EMAIL COMPONENTS UTILIZING A CONSTRAINT-BASED KNOWLEDGE REPRESENTATION

(71) Applicant: Adobe Inc., San Jose, CA (US)

(72) Inventors: Yeuk-yin Chan, New York, NY (US); Andrew Thomson, Moraga, CA (US); Caroline Kim, San Francisco, CA (US); Cole Connelly, New York, NY (US); Eunyee Koh, San Jose, CA (US); Michelle Lee, San Francisco, CA (US); Shunan Guo, San Jose, CA (US)

(73) Assignee: Adobe Inc., San Jose, CA (US)

( * ) Notice: Subject to any disclaimer, the term of this patent is extended or adjusted under 35 U.S.C. 154(b) by 976 days.

(21) Appl. No.: 18/055,238

(22) Filed: Nov. 14, 2022

(65) Prior Publication Data

US 2024/0163238 A1 May 16, 2024

(51) Int. Cl.
*G06F 3/04842* (2022.01)
*G06F 8/38* (2018.01)
(Continued)

(52) U.S. Cl.
CPC .......... *H04L 51/07* (2022.05); *G06F 3/04842* (2013.01); *G06F 8/38* (2013.01);
(Continued)

(58) Field of Classification Search
CPC .... G06F 3/04842; G06F 8/38; G06F 16/3322; H04L 51/07; G06N 5/00
See application file for complete search history.

(56) References Cited

U.S. PATENT DOCUMENTS 7,069,497 B1 * 6/2006 Desai .................... G06F 16/958 715/255
8,527,867 B2 * 9/2013 Nair ........................ G06F 16/24 715/234
(Continued)

OTHER PUBLICATIONS

M Elgin Akpinar and Yeliz Yeşilada. 2013. Heuristic role detection of visual elements of web pages. In International Conference on Web Engineering. Springer, 123-131.
(Continued)

*Primary Examiner* — Douglas M Slachta
(74) *Attorney, Agent, or Firm* — Keller Preece PLLC

(57) ABSTRACT

The present disclosure relates to systems, methods, and non-transitory computer-readable media that generates editable email components by utilizing an Answer Set Programming (ASP) model with hard and soft constraints. For instance, in one or more embodiments, the disclosed systems generate editable email components from email fragments of an email file utilizing an Answer Set Programming (ASP) model. In particular, the disclosed systems extract facts for the ASP model from the email file. In addition, the disclosed systems determine rows or columns defining cells of the email file utilizing ASP hard constraints defined by a first set of ASP atoms corresponding to the facts. Moreover, the disclosed systems determine editable email component classes for the email fragments utilizing ASP soft constraints defined by ASP classification weights and a second set of ASP atoms corresponding to the facts.

20 Claims, 12 Drawing Sheets

(51) Int. Cl.

| | |
|---|---|
| ***G06F 16/332*** | (2025.01) |
| ***G06F 40/103*** | (2020.01) |
| ***G06N 5/00*** | (2023.01) |
| ***H04L 51/07*** | (2022.01) |

(52) U.S. Cl.

CPC ........ *G06F 16/3322* (2019.01); *G06F 40/103* (2020.01); *G06N 5/00* (2013.01)

(56) References Cited

U.S. PATENT DOCUMENTS

| | | | | |
|---|---|---|---|---|
| 8,620,848 | B1 * | 12/2013 | Komissarchik | G06F 16/345 706/46 |
| 8,832,205 | B2 * | 9/2014 | Nelson | G06Q 10/109 709/205 |
| 9,384,187 | B2 * | 7/2016 | Verma | G06F 16/93 |
| 10,120,845 | B1 * | 11/2018 | Palm | G06F 16/22 |
| 10,657,313 | B2 * | 5/2020 | Marchsreiter | G06F 40/166 |
| 11,144,718 | B2 * | 10/2021 | Park | G06N 20/00 |
| 11,323,543 | B2 * | 5/2022 | Fedyak | G06F 9/5033 |
| 12,333,240 | B2 * | 6/2025 | Becker | G06F 40/258 |
| 2008/0178073 | A1 * | 7/2008 | Gao | G06F 40/166 715/752 |
| 2014/0280134 | A1 * | 9/2014 | Horen | G06Q 10/10 707/736 |
| 2015/0032829 | A1 * | 1/2015 | Barshow | H04L 51/216 709/206 |
| 2015/0212889 | A1 * | 7/2015 | Amarendran | G06F 11/1448 707/674 |
| 2015/0347368 | A1 * | 12/2015 | Carlen | H04L 51/08 715/230 |
| 2019/0155870 | A1 * | 5/2019 | Prakash | G06F 40/103 |

OTHER PUBLICATIONS

Massimiliano Albanese, Matthias Broecheler, John Grant, Maria Vanina Martinez, and VS Subrahmanian. 2011. PLINI: a probabilistic logic program framework for inconsistent news information. In Logic programming, knowledge representation, and nonmonotonic reasoning. Springer, 347-376.

Gerhard Brewka, Thomas Eiter, and Mirosław Truszczyński. 2011. Answer set programming at a glance. Commun. ACM 54, 12 (2011), 92-103.

Radek Burget and Ivana Rudolfova. 2009. Web page element classification based on visual features. In 2009 First Asian Conference on Intelligent Information and Database Systems. IEEE, 67-72.

Deng Cai, Shipeng Yu, Ji-Rong Wen, and Wei-Ying Ma. 2003. Vips: a visionbased page segmentation algorithm. (2003).

Hadrien Cambazard, Tarik Hadzic, and Barry O'Sullivan. 2010. Knowledge compilation for itemset mining. In ECAI 2010. IOS Press, 1109-1110.

Sonia Castelo, Thais Almeida, Anas Elghafari, Aécio Santos, Kien Pham, Eduardo Nakamura, and Juliana Freire. 2019. A topic-agnostic approach for identifying fake news pages. In Companion proceedings of the 2019 World Wide Web conference. 975-980.

Sandip Debnath, Prasenjit Mitra, and C Lee Giles. 2005. Automatic extraction of informative blocks from webpages. In Proceedings of the 2005 ACM symposium on Applied computing. 1722-1726.

Carlos Duarte, Ana Salvado, M Elgin Akpinar, Yeliz Yeşilada, and Luís Carriço. 2018. Automatic role detection of visual elements of web pages for automatic accessibility evaluation. In Proceedings of the 15th International Web for All Conference. 1-4.

Julien Dumazert. 2017. Understanding the layout of webpages using automatic zone recognition. Contentsquare Engineering: Stories from the people building Contentsquare (Mar. 6, 2017)(Year: 2017) (2017).

Esra Erdem, Erdi Aker, and Volkan Patoglu. 2012. Answer set programming for collaborative housekeeping robotics: representation, reasoning, and execution. Intelligent Service Robotics 5, 4 (2012), 275-291.

Esra Erdem, Michael Gelfond, and Nicola Leone. 2016. Applications of answer set programming. AI Magazine 37, 3 (2016), 53-68.

Esra Erdem and Umut Oztok. 2015. Generating explanations for biomedical queries. Theory and Practice of Logic Programming 15, 1 (2015), 35-78.

Esra Erdem and Ferhan Türe. 2008. Efficient Haplotype Inference with Answer Set Programming.. In AAAI, vol. 8. 436-441.

Chia-Hsin Huang, Po-Yi Yen, Yi-Chan Hung, Tyng-Ruey Chuang, and Hahn-Ming Lee. 2006. Enhancing Entropy-based Informative Block Identification Using Block Preclustering Technology. In 2006 IEEE International Conference on Systems, Man and Cybernetics, vol. 3. IEEE, 2640-2645.

Salvatore Maria Ielpa, Salvatore Iiritano, Nicola Leone, and Francesco Ricca. 2009. An ASP-based system for e-tourism. In International Conference on Logic Programming and Nonmonotonic Reasoning. Springer, 368-381.

Said Jabbour, Lakhdar Sais, and Yakoub Salhi. 2015. Decomposition based SAT encodings for itemset mining problems. In Pacific-Asia Conference on Knowledge Discovery and Data Mining. Springer, 662-674.

Matti Järvisalo. 2011. Itemset mining as a challenge application for answer set enumeration. In International Conference on Logic Programming and Nonmonotonic Reasoning. Springer, 304-310.

Mohd Nizam Kassim, Mohd Aizaini Maarof, and Majid Bakhtiari. 2020. Fraudulent e-Commerce Website Detection Model Using HTML, Text and Image Features. In Proceedings of the 11th International Conference on Soft Computing and Pattern Recognition (SoCPaR 2019), vol. 1182. Springer Nature, 177.

Milos Kovacevic, Michelangelo Diligenti, Marco Gori, and Veljko Milutinovic. 2002. Recognition of common areas in a web page using visual information: a possible application in a page classification. In 2002 IEEE International Conference on Data Mining, 2002. Proceedings. IEEE, 250-257.

Yuancheng Li and Jie Yang. 2009. A novel method to extract informative blocks from web pages. In 2009 International Joint Conference on Artificial Intelligence. IEEE, 536-539.

Yukun Li, Zhenguo Yang, Xu Chen, Huaping Yuan, and Wenyin Liu. 2019. A stacking model using URL and HTML features for phishing webpage detection. Future Generation Computer Systems 94 (2019), 27-39.

Seung-Jin Lim and Yiu-Kai Ng. 2001. An automated change-detection algorithm for HTML documents based on semantic hierarchies. In Proceedings 17th International Conference on Data Engineering. IEEE, 303-312.

Sonal Mahajan and William GJ Halfond. 2015. Detection and localization of html presentation failures using computer vision-based techniques. In 2015 IEEE 8th International Conference on Software Testing, Verification and Validation (ICST). IEEE, 1-10.

Marco Manna, Francesco Ricca, and Giorgio Terracina. 2013. Consistent query answering via ASP from different perspectives: Theory and practice. Theory and Practice of Logic Programming 13, 2 (2013), 227-252.

Siegfried Nijssen and Tias Guns. 2010. Integrating constraint programming and itemset mining. In Joint European Conference on Machine Learning and Knowledge Discovery in Databases. Springer, 467-482.

Francesco Ricca, Antonella Dimasi, Giovanni Grasso, Salvatore Maria Ielpa, Salvatore Iiritano, Marco Manna, and Nicola Leone. 2010. A logic-based system for e-tourism. Fundamenta Informaticae 105, 1-2 (2010), 35-55.

Sebastian Ruder. 2016. An overview of gradient descent optimization algorithms. arXiv preprint arXiv:1609.04747 (2016).

Torsten Schaub and Stefan Woltran. 2018. Special issue on answer set programming. KI—Künstliche Intelligenz 32, 2 (2018), 101-103.

Sanjeev Kumar Singh. 2014. Identifying Webpage Regions and Their Roles by Combining Image Processing and Markup Analysis. Ph. D. Dissertation.

Erdinç Uzun, Hayri Volkan Agun, and Tarik Yerlikaya. 2013. A hybrid approach for extracting informative content from web pages. Information Processing & Management 49, 4 (2013), 928-944.

(56) References Cited

OTHER PUBLICATIONS

Yi Wang, Joohyung Lee, and Doo Soon Kim. 2017. A logic based approach to answering questions about alternatives in diy domains. In Twenty-Ninth IAAI Conference.
Tim Weninger, William H Hsu, and Jiawei Han. 2010. CETR: content extraction via tag ratios. In Proceedings of the 19th international conference on World wide web. 971-980.
Yudong Yang, Yu Chen, and HongJiang Zhang. 2003. HTML page analysis based on visual cues. In Web Document Analysis: Challenges and Opportunities. World Scientific, 113-131.
Lan Yi and Bing Liu. 2003. Web page cleaning for web mining through feature weighting. In IJCAI, vol. 3. Citeseer, 43-48.
Lan Yi, Bing Liu, and Xiaoli Li. 2003. Eliminating noisy information in web pages for data mining. In Proceedings of the ninth ACM SIGKDD international conference on Knowledge discovery and data mining. 296-305.

* cited by examiner

GENERATING EDITABLE EMAIL COMPONENTS UTILIZING A CONSTRAINT-BASED KNOWLEDGE REPRESENTATION

BACKGROUND

Recent years have seen significant advancement in hardware and software platforms for enabling client devices to create and/or manipulate digital content. For example, many platforms offer software applications that provide for enterprise-level email editing and design. Some of these software application platforms further implement systems for convenient drag-and-drop functionalities to add email components such as titles, images, buttons, and links to the email. Accordingly, client devices can create, edit, manage, and distribute enterprise-level emails across computer networks. For instance, often in this field software applications provide email editing for designers to perform A/B testing (e.g., to determine the most optimal locations to place an email components). However, despite these advancements, email editing platforms continue to suffer from a variety of problems, including computing inefficiency, operational inflexibility, and functional inaccuracy.

SUMMARY

One or more embodiments described herein provide benefits and/or solve one or more of problems in the art with systems, methods, and non-transitory computer-readable media that generate editable email components from email fragments utilizing a constraint-based knowledge representation, such as an Answer Set Programming (ASP) model with hard and soft constraints. For instance, in one or more embodiments, the disclosed systems utilize an ASP model to efficiently and accurately generate editable email components from email fragments of an email file. For example, the disclosed systems detect email components with a collection of constraints (and weights for soft constraints) with a mechanism to learn weights from experimental data. Using constraints, the disclosed systems can take the heuristics of different components and express them in a concrete, extensible, and deterministic form. Moreover, the disclosed systems can efficiently augment ASP detection models with additional constraints and updated weights. Thus, the disclosed systems can utilize ASP hard and soft constraints to more accurately, efficiently, and flexibly convert email fragments to editable email components for email editing applications.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This Disclosure Will Describe One or More Embodiments of the Invention with Additional Specificity and Detail by Referencing the Accompanying Figures. The Following Paragraphs Briefly Describe Those Figures, in which.

DETAILED DESCRIPTION

Figure 1:
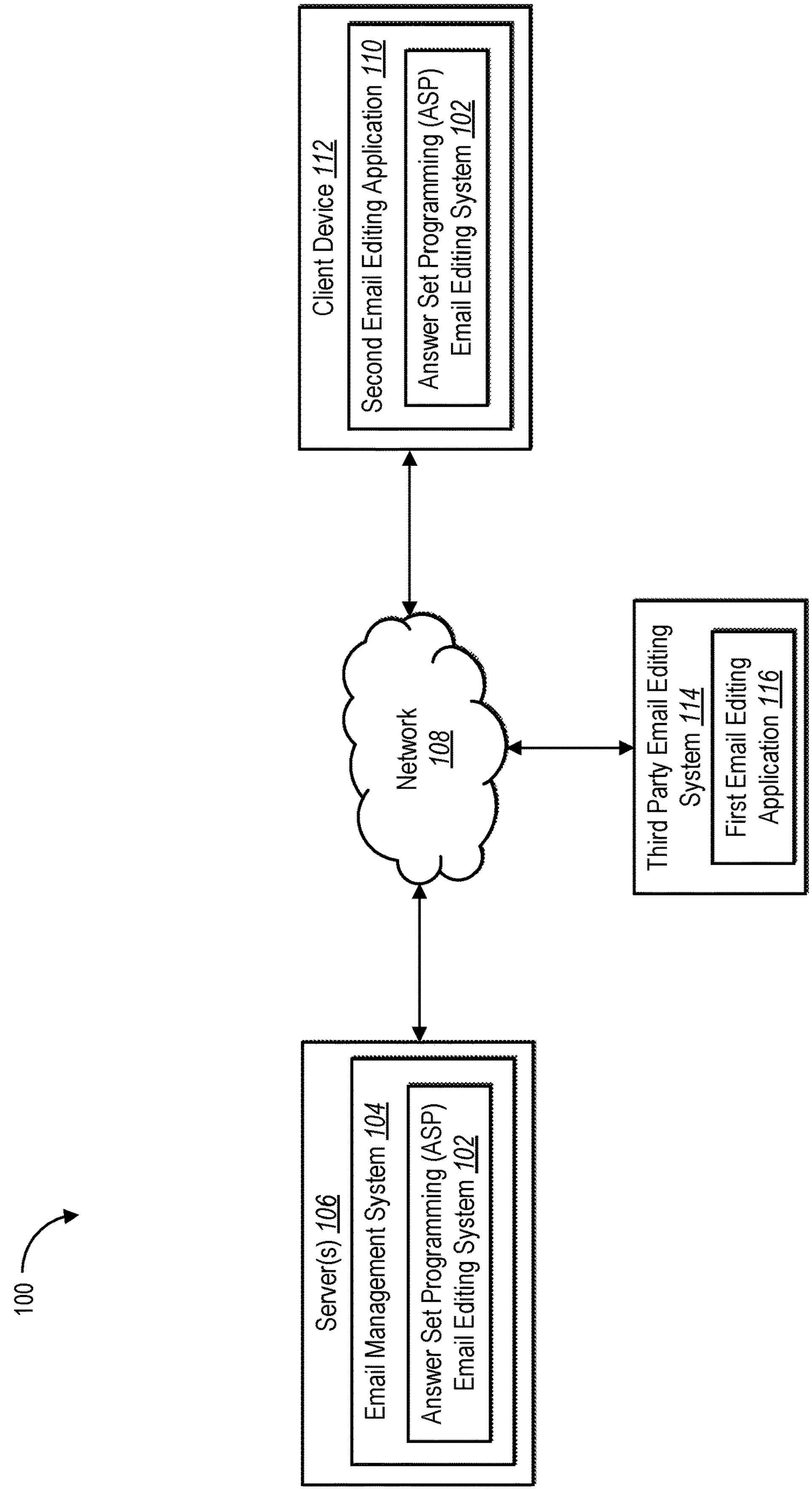
FIG. 1 illustrates an example environment in which an Answer Set Programming (ASP) email editing system operates in accordance with one or more embodiments.

One or more embodiments described herein include an ASP email editing system that generates editable email components from an email file of a first email editing application for editing within a second email editing application by utilizing a constraint-based knowledge representation, such as an Answer Set Programming model. Conventional systems suffer from several technological shortcomings that result in inefficient, inflexible, and inaccurate operation. For example, with regard to inefficiency, conventional systems require extensive time and computational resources to generate and execute lengthy code formulations in detecting email components. For example, conventional systems typically require generating written conditional statements that include thousands and thousands of lines of code to address various cases that may arise. This approach requires significant time and user interface interactions that utilize significant computing resources to develop and execute.

Conventional systems also suffer from operational inflexibility and shortcomings in functionality. For example, some conventional systems utilize machine learning to automatically identify objects within an email. However, machine learning models are often inflexible and fail to detect email components that were not included in machine learning training data. Accordingly, such systems fail to functionally adapt and extend to cover email components that are unfamiliar or uncommon.

In addition, conventional systems that utilize machine learning models are also inflexible in that they rely on a black-box prediction approach. Indeed, conventional systems train machine learning models by modifying internal weights or parameters that are not externally understandable or interpretable. Accordingly, such systems are inexpressive and inextensible without undergoing the computationally expensive process of re-training the machine learning model. Moreover, such systems are notoriously difficult (and inefficient) to develop and maintain. Thus, conventional systems are unable to flexibly adapt (e.g., by incorporating user interaction or selection in modeling to address email component detection).

Moreover, some conventional systems fail to provide email editing capabilities for email files that are not created within the same email editing application. In particular, some conventional systems fail to provide third-party editing functionality because different email editing applications used different names, tags, classes, elements, and assignments. Accordingly, these conventional systems fail to provide cross-operability between email editing applications.

In addition, conventional systems are often inaccurate. For example, conventional systems are often ineffective at identifying, classifying, and converting email fragments from email files to editable email components. Indeed, the use of lengthy conditional statements, black-box machine learning models, and unstandardized email files, causes conventional systems to inaccurately detect email components. Moreover, as mentioned above, trained machine learning models often fail in extending the model to cover uncommon email components or circumstances.

In contrast, the ASP email editing system utilizes a constraint-based knowledge representation to generate editable email components from incompatible email files. For example, the ASP email editing system uses Answer Set Programming, represents email files as a set of logical facts, and represents components of the email files as a collection of hard and soft constraints over the set of logical facts. In particular, in one or more implementations the ASP email editing system extracts facts of the email fragments from the email files into pre-defined email components that conform with hard constraints and determines the most preferred components in accordance with established soft constraints. To illustrate, the constraints utilized by the ASP email editing system accommodates deterministic and probabilistic objectives—the ASP email editing system strictly conforms with hard constraints and utilizes soft constraints to determine a selection preference for detecting email components. In one or more embodiments, the ASP email editing system learns these weights through machine learning to automatically configure soft constraints with previous emails as training samples. By formulating this process as a multi-class regression problem, the ASP email editing system can take machine learning models and combine both heuristic rules (e.g., flexible, client-modifiable rules) and learned weights into a single system.

As mentioned above, the ASP email editing system extracts facts of the email fragments. In one or more example embodiments, the ASP email editing system determines facts of the email fragments from the email file by using an HTML specification. In particular, the ASP email editing system determines facts based on an embedded style sheet of the email file. To illustrate, the ASP email editing system iterates through the HTML embedded style sheet to determine a plurality of facts within the embedded style sheet. In another example embodiment, the ASP email editing system extracts facts by rendering the HTML email file in a browser. In particular, the ASP email editing system determines email fragment (e.g., HTML fragment) width, height, or position by rendering the HTML email file within a browser. In other example embodiments, the ASP email editing system utilizes a computer vision library. In particular, the ASP email editing system extracts colors or fonts from the HTML email file by utilizing a computer vision library.

As also mentioned above, the ASP email editing system determines rows or columns. In one or more example embodiments, the ASP email editing system initially determines rows of the email file and then determines columns. In particular, the ASP email editing system determines rows or columns with ASP hard constraints as part of an ASP row detection task. To illustrate, the ASP email editing system determines a set of row partition results by utilizing the ASP hard constraints and determines a number of row partitions of the set of row partitions by utilizing a head ASP atom. The ASP email editing system selects rows or columns defining cells by using an ASP objective function based on the head ASP atom. For example, in one or more embodiments, the hard constraints include parameters that determine at least one of a number of rows, an email element overlap hard constraint, or an element cross-row duplication hard constraint.

In addition to the hard constraints, in one or more implementations the ASP email editing system also determines soft constraints. In one or more embodiments, the ASP email editing system determines the ASP soft constraints after determining the rows and columns of the email file by executing an ASP element classification task. To illustrate, the ASP email editing system utilizes a series of ASP soft constraints with different weights to efficiently determine email editable mail component classes for email fragments from the email file. The ASP email editing system utilizes for the soft constraints a bodiless rule defined by an ASP atom that corresponds to an email component feature and ASP weight. Moreover, the ASP email editing system selects the editable email component class for an email fragment by utilizing an ASP objective function based on the weights of the soft constraints.

As mentioned above, the ASP email editing system generates editable email components from the email file utilizing the hard and soft constraints. In one or more example embodiments, to generate the editable email components, the ASP email editing system identifies incompatible labels for the email fragments. In particular, the ASP email editing system generates labels for the email fragments upon determining the editable email component classes. The ASP email editing system generates HTML labels compatible with the utilized email editing application. To illustrate, the ASP email editing system replaces the incompatible labels (e.g., HTML tags or classes) for the email fragments with compatible labels.

Furthermore, after the ASP email editing system generates editable email components from the email file, the ASP email editing system provides the editable email components to a client device. In one or more example embodiments, the ASP email editing system, provides the editable email components for display within a graphical user interface of a client device. In particular, the display shows the email file with different editable email components for modifying the email components. To illustrate, the ASP email editing system provides editing options to the user based on the classes of the editable email components.

In addition to the above discussion, the ASP email editing system also learns machine learning ASP weights for the ASP soft constraints. In one or more example embodiments, the ASP email editing system generates a set of ASP soft constraints of an ASP model for detecting email component elements in incompatible email files. In particular, the ASP email editing system receives training samples that include email fragments, features corresponding to the training email fragments, and ground truth component classes corresponding to the training email fragments. To illustrate, the ASP email editing system trains and generates machine-learning ASP weights to predict editable email component classes based on the training email fragments, the features, and the ground truth component classes.

The ASP email editing system provides several advantages over conventional systems. For example, the ASP email editing system operates more efficiently than conventional systems. In particular, the ASP email editing system utilizes Answer Set Programming (ASP) to extract facts from the email file, determine rows or columns with ASP hard constraints and determine editable email component classes with ASP soft constraints. In utilizing the ASP model, the ASP email editing system avoids lengthy conditional statements and reduces the time, user interactions, and computing resources needed to develop a pertinent model and detect email components. Indeed, researchers have established that the ASP email editing system can process almost 1000 emails in less than 15 seconds, with reduced processing times for smaller batch sizes (e.g., less than one second for individual emails and less than five seconds on average for batches of 200 emails).

In one or more implementations, the ASP email editing system also improves functionality and flexibility relative to conventional systems. As an initial matter, the ASP email editing system can improve functionality by converting email files to editable components, even when email files are generated by other, incompatible email editing applications. Indeed, in one or more embodiments, the ASP email editing system improves functionality by providing cross-operability between different email editing applications. For example, the ASP email editing system utilizes ASP with hard and soft constraints and in doing so, identifies incompatible labels for email fragments and replaces incompatible labels with compatible labels to generate editable email components. In particular, the use of the ASP model allows the ASP email editing system to efficiently detect email components within unstructured email files and provide for editable email components within an email editing application.

In addition, by utilizing ASP constraints, the ASP email editing system has an open, transparent, and easily traceable set of rules and rationales for preference weights assigned to detection of email components. In particular, in one or more embodiments, the ASP email editing system efficiently extends and covers unfamiliar or uncommon email components by utilizing the ASP model. The ASP soft constraints have an easily readable syntax and clear weights assigned to particular email component classes. In one or more implementations, developers in the ASP email editing system efficiently trace and modify (with client or machine learning input) how the ASP email editing system assigns weights and detects email components (unfamiliar email components).

Furthermore, in one or more embodiments, the ASP email editing system further improves the flexibility and functionality of detecting email components by training ASP weights in a machine learning model for further optimization. Rather than merely using a machine learning model to automatically identify objects within an email, the ASP email editing system can take a more sophisticated approach of implementing its email component detection within an ASP model and then further training those results in a machine learning model. Thus, the ASP email editing system can provide flexible, transparent ASP soft classification rules with machine-learned weights (avoiding the black-box problem of conventional systems). The ASP email editing system can also incorporate user interaction and selection in modifying weights and ASP soft classifications, providing client-focused solution.

In one or more implementations, the ASP email editing system also improves accuracy relative to conventional systems. By utilizing an ASP model to implement email component detection, the ASP email editing system avoids lengthy inefficient conditional statements, provides for transparent traceable rules/rationales, and interoperability between different email editing applications. As a result, in one or more embodiments the ASP email editing system improves upon the accuracy of detecting email components even for unstructured HTML email files or unfamiliar/uncommon email components. In addition, by utilizing a machine learning model to determine soft constraint weights, the ASP email editing system can improve accuracy of the learned weights while maintaining the flexibility of ASP soft constraints. For example, researchers have determined that for some component classes, classification accuracy increased by over 60% (from 25% to 88%) relative to hand-crafted model weights.

Additional detail regarding the ASP email editing system will now be provided with reference to the figures. For example, FIG. 1 illustrates a schematic diagram of an exemplary system environment 100 in which the ASP email editing system 102 operates. As illustrated in FIG. 1, the system environment 100 includes a server(s) 106, an email management system 104, a network 108, a third-party email editing system 114, and client device 112.

Although the system environment 100 of FIG. 1 is depicted as having a particular number of components, the system environment 100 is capable of having any number of additional or alternative components (e.g., any number of servers, client devices, or other components in communication with the ASP email editing system 102 via the network 108). Similarly, although FIG. 1 illustrates a particular arrangement of the server(s) 106, the network 108, and the client device 112, various additional arrangements are possible.

The server(s) 106, the network 108, and the client device 112 are communicatively coupled with each other either directly or indirectly (e.g., through the network 108 discussed in greater detail below in relation to FIG. 11). Moreover, the server(s) 106 and the client device 112 include one or more of a variety of computing devices (including one or more computing devices as discussed in greater detail with relation to FIG. 11).

As mentioned above, the system environment 100 includes the server(s) 106. In one or more embodiments, the server(s) 106 receives, generates, extracts, and/or determines editable email components for email files. In one or more embodiments, the server(s) 106 comprises a data server. In some implementations, the server(s) 106 comprises a communication server or a web-hosting server.

In one or more embodiments, the client device 112 includes computing devices that can edit, modify, convert, and/or provide, for display, editable email components for email files on a second email editing application 110. For example, the client device 112 includes smartphones, tablets, desktop computers, laptop computers, head-mounted-display devices, or other electronic devices. The client device 112 includes one or more applications (e.g., the second email editing application 110) that can access, edit, modify, convert, and/or provide, for display, editable email components of an email file. For example, in one or more embodiments, the second email editing application 110 includes a software application installed on the client device 112. Additionally, or alternatively, the second email editing application 110 includes a software application hosted on the server(s) 106 which may be accessed by the client device 112 through another application, such as a web browser.

Furthermore, the system environment 100 includes the third-party email editing system 114 with a first email editing application 116 for the client device 112 to receive third-party email files. In one or more example implementations, the ASP email editing system 102 receives via the network 108 a third-party email file from the third-party email editing system 114. In particular, the network 108 transmits the third-party email file to the client device 112 for further modification/editing. To illustrate, the client device 112 utilizes the second email editing application 110 and the ASP email editing system 102 to make the modifications to the third-party email files via detection of email components.

To provide an example implementation, in some embodiments, the ASP email editing system 102 on the server(s) 106 supports the ASP email editing system 102 on the client device 112. For instance, in some cases, the email management system 104 on the server(s) 106 gathers data for the ASP email editing system 102. The ASP email editing system 102 then, via the server(s) 106, provides the information to the client device 112. In other words, the client device 112 obtains (e.g., downloads) the ASP email editing system 102 from the server(s) 106. Once downloaded, the ASP email editing system 102 on the client device 112 generates editable email components of an email file.

In alternative implementations, the ASP email editing system 102 includes a web hosting application that allows the client device 112 to interact with content and services hosted on the server(s) 106. To illustrate, in one or more implementations, the client device 112 accesses a software application supported by the server(s) 106. In response, the ASP email editing system 102 on the server(s) 106, generates and provides editable email components of an email file. The server(s) 106 then provides the editable email components to the client device 112 for display.

To illustrate, in some cases, the ASP email editing system 102 on the client device 112 collects and sample email files, detected email components, and ASP weights supported by the server(s) 106. The client device 112 transmits the collection to the server(s) 106. In response, the ASP email editing system 102 on the server(s) 106 further trains the ASP weights and the detection of email components based on the received results and other received sample email files.

Indeed, the ASP email editing system 102 is able to be implemented in whole, or in part, by the individual elements of the system environment 100. For instance, although FIG. 1 illustrates the ASP email editing system 102 implemented with regard to the server(s) 106, different components of the ASP email editing system 102 are able to be implemented by a variety of devices within the system environment 100. For example, one or more (or all) components of the ASP email editing system 102 are implemented by a different computing device (e.g., the client device 112) or a separate server from the server(s) 106. Indeed, as shown in FIG. 1, the client device 112 includes the ASP email editing system 102. Example components of the ASP email editing system 102 will be described below with regard to FIG. 7.

Figure 2:
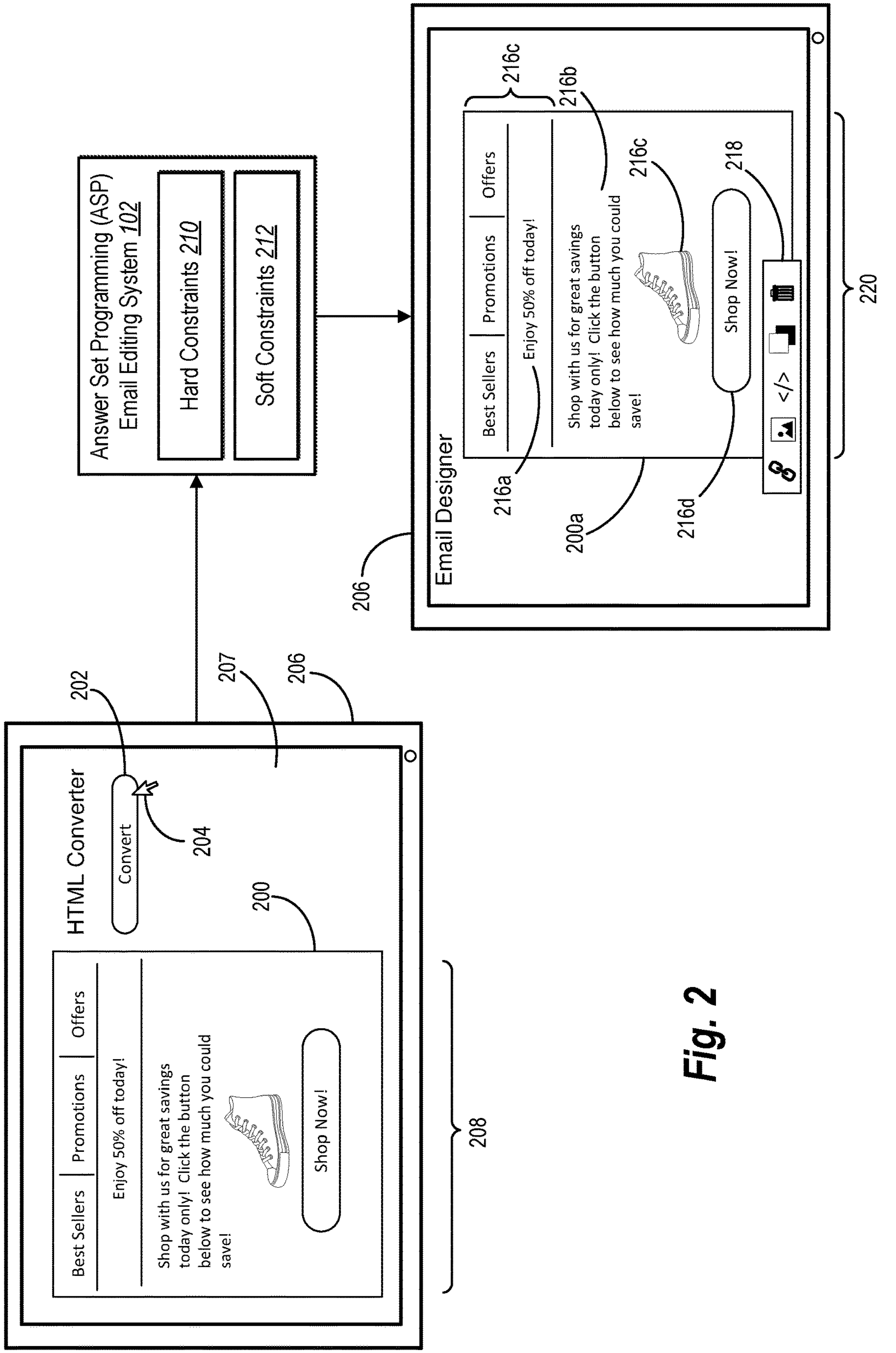
FIG. 2 illustrates an overview diagram of the ASP email editing system converting an email file for use in an email editing application in accordance with one or more embodiments.

As mentioned, in one or more embodiments, the ASP email editing system 102 converts third-party email files to provide editable email components in an email editing application. For example, FIG. 2 illustrates the ASP email editing system 102 converting an email file 200 to an editable email having editable email components for text, an image, a button, and a header in accordance with one or more embodiments. In particular, the email file 200 includes an email file.

As illustrated, the ASP email editing system 102 displays the email file 200 via a graphical user interface 208. In particular, the graphical user interface 208 displays the received email file 200, and various options to apply to the email file 200. To illustrate, options provided by the ASP email editing system 102 include saving, deleting, uploading another email file, or performing various functions to the email file 200 to prepare it for email component detection (discussed in more detail below).

As mentioned, the client device 206 receives the email file 200. In one or more example embodiments, the ASP email editing system 102 monitors email files uploaded or accessed from the email editing application 207 to determine whether the email file is a third-party file. In particular, for HTML email files, the ASP email editing system 102 monitors the email editing application 207 by detecting the HTML labels utilized within the utilized email file 200. When the HTML labels of the email file 200 do not correspond with the ASP email editing system 102 HTML labels (e.g., tags or classes), the ASP email editing system 102 determines the email file 200 as a third-party HTML email file. In one or more example embodiments, the ASP email editing system 102 determines the third-party HTML file as an incompatible file. In particular, incompatible refers to a file with HTML labels, classes, tags, format, hierarchy, or syntax that does not conform with one email editing application (e.g., the email editing application 207) but conforms with another email editing application (e.g., a third-party email editing application). To illustrate, in response to determining the email file 200 as a third-party HTML email file e.g., incompatible with the email editing application 207, the ASP email editing system 102 provides a convert option 202.

As just mentioned, the ASP email editing system 102 provides the convert option 202 to the client device 206. In one or more example embodiments, the ASP email editing system 102 provides the convert option 202 to a user of the client device 206 and performs a convert function in response to a selection 204. In particular, the selection 204 of the convert option 202 indicates to the ASP email editing system 102 to perform the convert function for the email file 200 by utilizing an ASP model of the ASP email editing system 102. In some implementations, the selection 204 includes a user of the client device 206 tapping or clicking the convert option 202. In some embodiments, the ASP email editing system 102 automatically converts the email file 200 (e.g., without providing a selection option and/or without user interaction). Indeed, the ASP email editing system 102 can convert the email file 200 upon determining that the email file 200 is incompatible with the email editing application 207.

As just discussed, the ASP email editing system 102 performs a convert function on the email file 200. In one or more embodiments, the ASP email editing system 102 extracts the underlying specification of the email file 200. In particular, the ASP email editing system 102 extracts the underlying specification of the email file 200 (for an HTML email file) for use within the ASP email editing system 102 to detect various email fragments and convert the email file 200 and corresponding fragments to editable email components compatible with the email editing application 207. To illustrate, the ASP email editing system 102 converts the extracted email file 200 by applying hard constraints 210 and soft constraints 212 of an ASP model. For instance, the ASP email editing system 102 applies hard constraints 210 for row/column detection of the email file 200. The ASP email editing system 102 utilizes hard constraints as strict parameters to conform with in determining rows and columns of the email file 200. Further, the ASP email editing system 102 applies soft constraints 212 for determining editable email component classes of the email file 200. The ASP email editing system 102 utilizes soft constraints as weighted preference parameters to conform with in determining editable email component classes. Utilizing this approach, the ASP email editing system 102 detects email components and convert the email file 200 so that it is compatible with the email editing application 207. More details relating to the ASP model, hard constraints 210, and soft constraints 212 is provided below in relation to FIGS. 3-6.

As further shown in FIG. 2, the ASP email editing system 102 generates a converted email file 200*a* and provides the converted email file 200*a* (with editable email components) for display via a graphical user interface 220. For example, the graphical user interface 220 identifies editable email component classes, converts email fragments based on the editable email component classes, and then provides the email components for display. As shown, the graphical user interface 220 displays editable email components 216*a*-216*d* (i.e., a text element, a text paragraph, an image, and a button). Based on user interaction, the ASP email editing system 102 can modify the editable email components 216*a*-216*d*. As shown in FIG. 2, 216*a* illustrates a header element, 216*b* illustrates a text element, 216*c* illustrates an image element, and 216*d* illustrates a button element. For example, upon user selection of the editable email component 216*b*, the ASP email editing system 102 provides editing options 218. Indeed, in relation to a text element, the ASP email editing system 102 provides options to modify font, justification, or bulleting. The ASP email editing system 102 can provide a variety of editing options for a variety of different editable email components (e.g., image editing options for an editable image element). Indeed, as another example, for an image element, the ASP email editing system 102 provides options for enlarging, cropping, duplicating, or changing image properties.

Figure 3:
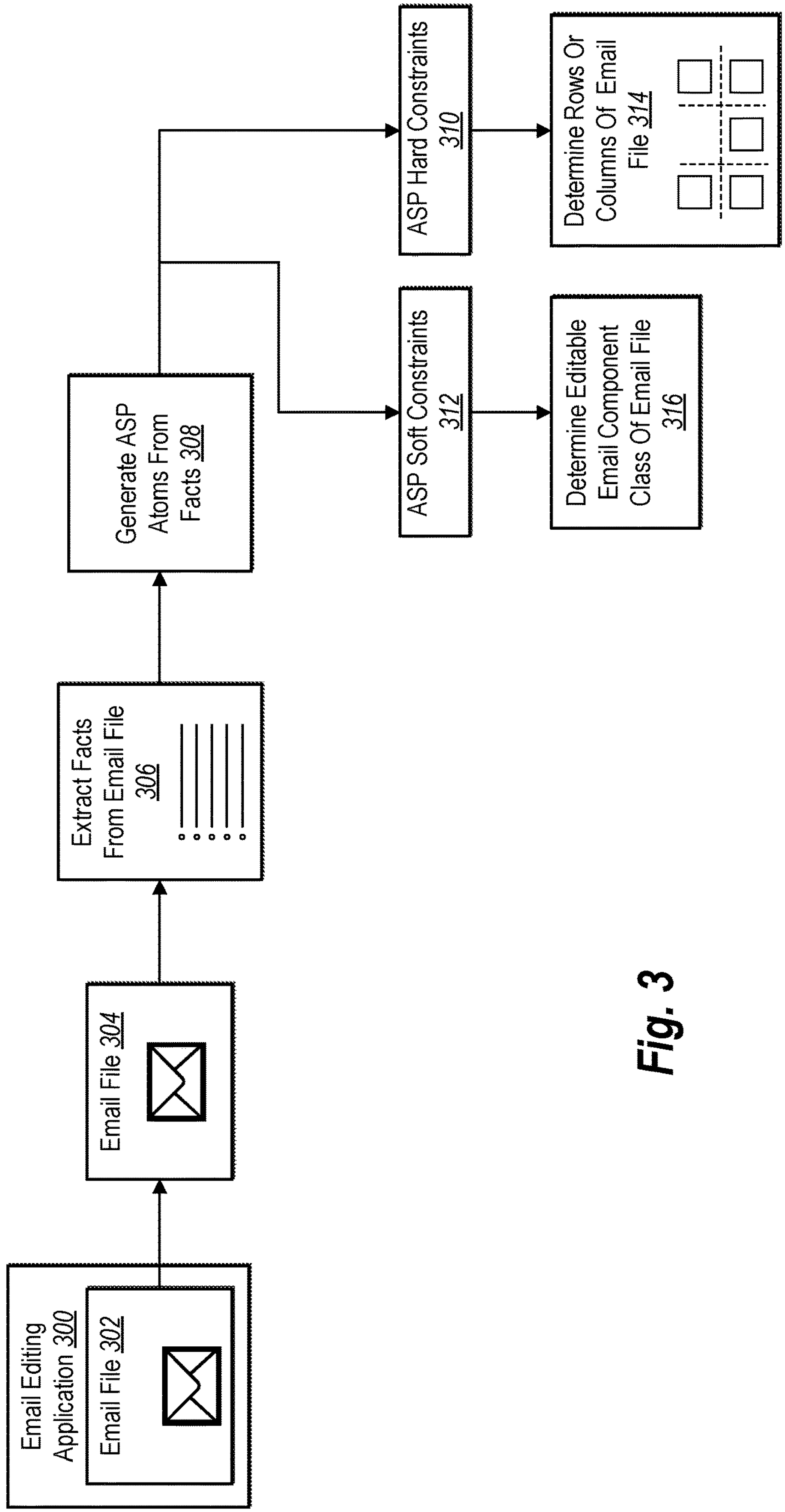
FIG. 3 illustrates an overview diagram for the ASP email editing system determining rows or columns and email component classes with hard and soft constraints in accordance with one or more embodiments.

As previously mentioned, in one or more embodiments, the ASP email editing system 102 utilizes hard and soft constraints to determine email component classes, rows and columns. FIG. 3 illustrates the ASP email editing system 102 receiving an email file 302, such as an HTML email file, determining editable email component classes of the email file 302 and determining rows or columns of the email file 302 in accordance with one or more embodiments.

As shown in FIG. 3, an email editing application 300 contains the email file 302. As mentioned previously, the ASP email editing system 102 receives the email file 302 as generated from the email editing application 300. In one or more embodiments, an email editing application refers to a software application for modifying or managing emails. For example, the email editing application 300 provides a software platform for email designers to modify HTML email files (e.g., for optimization such as via A/B testing). Furthermore, in one or more implementations, third-party email editing applications utilize a naming convention for email component elements of an HTML email file differently from the email editing application 300. To illustrate, in some instances a row with three columns is defined with either a <div> tag or a <table> tag and a button component is defined with either a <button> tag or an <a> tag. Regardless of which tag an email editing application uses, email files within an email editing application can visually appear the same.

As also just mentioned, the email editing application 300 contains the email file 302. In one or more embodiments the email file 302 includes an HTML email file. For example, an email file refers to a digital representation of an electronical mail item (e.g., a template email). In particular, an HTML email file refers to a storage unit with HTML syntax written into the document, where the HTML syntax defines the appearance of the email. To illustrate, email designers utilize HTML email files to tailor the appearance of emails to send out, and in some instances, email designers store the HTML email file for later modification. As shown in FIG. 3, the ASP email editing system 102 performs an act 304 of receiving the HTML email file from the email editing application 300. In particular, the ASP email editing system 102, in response to detecting the HTML email file on the email editing application 300 sends a signal to the email editing application 300 to send the email file 302. To illustrate, the act 304 of receiving the email file 302 causes the ASP email editing system 102 to execute additional tasks discussed below.

As further shown in FIG. 3, the ASP email editing system 102 performs an act 304 of receiving the email file 302 from the email editing application 300. As discussed above (e.g., with regard to FIG. 2), the ASP email editing system 102 can receive the email file 302 from a variety of sources (e.g., from a third-party system or uploaded from a client device).

As also shown in FIG. 3, the ASP email editing system 102 also performs an act 306 of extracting facts from the email file 302. In one or more embodiments, facts refer to extracted data, syntax, and information from an HTML email file (e.g., that represent characteristics of web content for the HTML email file). In particular, for facts, the ASP email editing system 102 represents HTML email files as a set of logical facts corresponding with ASP atoms within the ASP email editing system 102. To illustrate, facts include information of the HTML email file such as width, height, font size, border width, text color, URL length, type of tags, number of paragraphs, and number of texts.

In one or more example embodiments, the ASP email editing system 102 performs the act 306 of extracting facts from the email file 302 by parsing an HTML specification of the email file 302 to obtain the facts. In particular, the HTML specification of the email file 302 includes an arrangement and style of a set of web contents. Tags within the HTML specification indicate different characteristics of the web content such as whether the email file 302 contains a website link, text, or an image. To illustrate, the HTML specification typically includes an embedded style sheet that defines styles within the email file 302 such as the background color and various positions of different email components. Further, in one or more embodiments, the HTML specification operates as a standalone file (e.g., external files such as CSS or JavaScript to display the contents of the HTML email file are not needed).

As just mentioned, the ASP email editing system 102 utilizes the embedded style sheet to extract facts for the ASP model. In one or more example embodiments, the ASP email editing system 102 extracts facts by rendering the email file 302. In particular, the ASP email editing system 102 renders the email file 302 (e.g., within a browser or other application) to acquire the appearance of the HTML of the email file 302. To illustrate, upon rendering the email file 302 the ASP email editing system 102 can extract information or statistics regarding the appearance of the email file 302 such as the width, height, and position.

In another example embodiment, rather than utilizing the embedded style sheet or rendering the HTML email file in a browser, the ASP email editing system 102 extracts facts by utilizing a computer vision library. In particular, the ASP email editing system 102 renders the email file 302 and formats the appearance of the rendered email as pixels. To illustrate, the ASP email editing system 102 then utilizes computer vision libraries to extract colors and fonts of the email file 302.

As mentioned previously, the ASP email editing system 102 utilizes the Answer Set Programming (ASP) model to determine email component classes, rows, and columns. In one or more example embodiments, an ASP model (or "constraint-based model" or "constraint-based knowledge representation") refers to a computer-implemented model that searches for answers over constraint-based problems. In particular, an ASP model implements declarative and logical programming to generate sets of possible answers according to different constraints and selects one of the possible answers that conforms with the various constraints. To illustrate, an ASP model include a declarative programming model based on stable model semantics (i.e., an answer set that defines declarative semantics with negation as failure) of logic programming. Utilizing an ASP model, the ASP email editing system 102 reduces search problems to computing stable models. Moreover, the ASP email editing system 102 utilizes answer set solvers (computer-implemented models or tasks for generating stable models) to perform the search. The ASP email editing system 102 can utilize a variety of answer set solvers/ASP solvers, such as dingo and DLV, which generate answer sets of a logic program input. To illustrate, the ASP email editing system 102 utilizes an ASP model by establishing constraints within the ASP model related to email component detection and generates editable email components by utilizing the ASP model. Furthermore, an ASP model generally includes three building blocks: atoms (explained in more detail below), literals (e.g., atoms and an atoms' negation), and rules (expressions of logic).

As just mentioned, the ASP model includes atoms. As shown in FIG. 3, the ASP email editing system 102 performs an act 308 of generating ASP atoms from the facts. As mentioned previously, the ASP model determines rows, columns, or editable email component classes by utilizing ASP atoms. In one or more example embodiments, ASP atoms refers to a factual statement that the ASP email editing system classifies as either true or false. In particular, the ASP email editing system matches the extracted facts (e.g., the ASP email editing system 102 performs the act 306 of extracting facts) from the email file 302 with ASP atoms. To illustrate, in the following example ASP rule, "a:−b, not c", each of a, b, and c are ASP atoms (e.g., each of a, b, and c is either true or false). Furthermore, in the rule "a:−b, not c", "a" is a head ASP atom and "a" is true if all literals (atoms and the atoms' negation) are true.

The ASP email editing system 102 can define a variety of atoms based on a variety of different facts extracted from an email file. For example, in extracting facts by parsing an HTML specification, the ASP email editing system 102 can defines atoms within the ASP model with the following definitions: "tag(<string>)" as the tag contained in the email fragment; "href(<string>)" as the domain of the website link inside the fragment; "nText(<int>)" as the number of texts inside the fragment; "nParagraph(<int>)" as the number of text paragraphs inside the fragment. Furthermore, usage examples for the atom definitions include "tag(img)" for "tag(<string>)", "href(google)" for "href(<string>)", "nText(10)" for "nText(<int>)", and "nParagraph(2)" for "nParagraph(<int>)".

As also previously discussed, the ASP email editing system 102 utilizes browser rendering for the act 306 of extracting facts. Accordingly, in some implementations, the ASP email editing system 102 also defines atoms from facts extracts utilizing a browser rendering, including "size(<int>, <int>)" as the size (width and height) of the fragment; "pos(<int>, <int>)" as the position (x and y) of the fragment; "childrenSize(<ID>, <int>, <int>)" as the i-th children element's size in the fragment; and "childrenPos(<id>, <int>, <int>)" as the i-th child element's position in the fragment. Furthermore, usage examples for the atom definitions include "size(100, 50)" for "size(<int>, <int>)", "pos(0, 0)" for "pos(<int>, <int>)", "childrenSize(1, 50, 20)" for "childrenSize(<ID>, <int>, <int>)", and "childrenPos(1, 0, 0)" for "childrenPos(<id>, <int>, <int>)".

Moreover, as previously discussed, the ASP email editing system 102 utilizes vision libraries for the act 306 of extracting facts. For example, in extracting facts utilizing vision libraries, the ASP email editing system 102 utilizes "bgColor(<int>, <int>, <int>)" as the RGB values of the fragment's background color and "fontSize(<int>)" as the font size of the text in the fragment. Furthermore, usage examples for the atom definitions include "bgColor (255, 255, 255)" for "bgColor(<int>, <int>, <int>)" and "fontSize (12)" for "fontSize(<int>)".

As mentioned above, the ASP email editing system 102 can utilize one or more soft constraints, which can incur preferences when searching for answers. For example, soft constraints are in the syntax of:~a, b. [w]. The rule is interpreted as follows: if the literals a, b are satisfied, the ASP email editing system 102 will impose a penalty equal to the weight w. Across a set of soft constraints in a program, the ASP email editing system 102 looks for an optimal answer set that minimizes the sum of weighted costs of all satisfied soft constraints. Therefore, soft constraints can be written with positive weights for unfavorable constraints (i.e., to penalize ASP literals), and those with negative weights (i.e., to reward ASP literals).

Continuing with FIG. 3, the ASP email editing system 102 performs an act of utilizing ASP hard constraints 310. For example, the ASP email editing system 102 determines rows or columns defining cells of the email file 302 utilizing ASP hard constraints. In particular, hard constraints 310 refer to strict parameters utilized by an ASP model. To illustrate, the ASP email editing system 102 may establish a hard constraint of "there will at most be four rows." In this instance, the ASP email editing system strictly determine that the email fragment contains at most 4 rules (<=4). As shown in FIG. 3, the ASP email editing system 102 utilizes ASP hard constraints 310. In particular, the ASP email editing system 102 utilizes the hard constraints 310 to perform an act 314 of determining rows or columns of the email file 302. Specifically, the ASP email editing system 102 utilizes efficient answer set solvers to identify an answer set from various possible combinations of rows or columns according to the hard constraints 310. More details relating to the ASP email editing system 102 utilizing hard constraints 310 and determining rows or columns of the email file 302 is given below (e.g., in relation to FIG. 4).

As also mentioned above, the ASP email editing system 102 also determines editable email component classes by performing an act of utilizing ASP soft constraints 312. In one or more example embodiments, soft constraints refer to adjustable or weighted preference parameters. In particular, a soft constraint includes weighted preferences between different conditions (e.g., favoring some conditions/features while punishing other conditions/features for a particular email component class). To illustrate, the ASP email editing system may establish soft constraints that reward selection of a class in response to a first feature and punish selection of the class in response to a second feature. In essence, the ASP email editing system 102 utilizes soft constraints to establish preferential classification treatment of certain editable email component classes. The ASP email editing system 102 utilizes answer set solvers to total the weights for each class and perform an act 316 of determining an editable email component class of the email file 302. More details relating to the ASP email editing system 102 utilizing ASP soft constraints 312 and determining editable email component classes of the email file 302 is given below in the description of FIGS. 5 and 6.

The ASP email editing system 102 utilizes ASP soft constraints defined by ASP classification weights. In one or more example embodiments, ASP classification weights refer to a weight utilized to classify an email fragment or component. In particular, the ASP email editing system 102 assigns an ASP classification weight for each email component indicating a level of preference or favorability for a particular classification. To illustrate, the ASP email editing system may have a weight of [−1] for a carousel class when "manyImages:−numOfImages(N), N>1" and a weight of [1] for an image class. In this instance, the negative weight indicates that the features weights towards a particular classification and the positive weight indicates that the feature weights against a particular classification. Accordingly, in the mentioned example, the ASP email editing system 102 weighs in favor of classifying an element as carousel when the number of images is greater than one and weighs against classifying an element as an image when the number of images is greater than one. More details relating to the use of soft constraints, weights, and determining editable email component classes of HTML email files is given below (e.g., in relation to FIG. 5).

Figure 4:
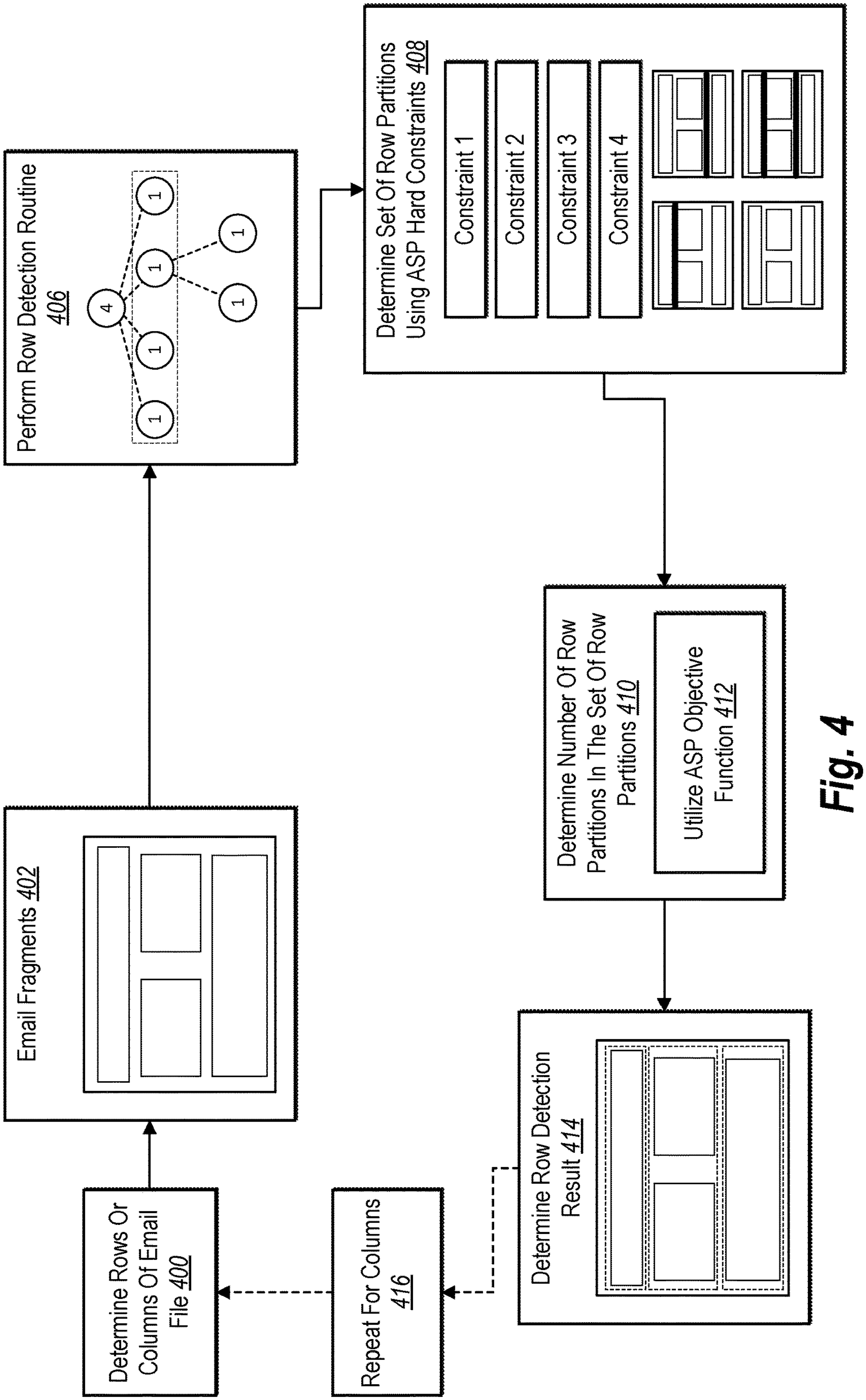
FIG. 4 illustrates a diagram of the ASP email editing system determining rows or columns of an email file by executing a detection task in accordance with one or more embodiments.

As previously mentioned, in some implementations the ASP email editing system 102 utilizes hard constraints to determine rows and columns of an HTML email file. FIG. 4 illustrates the ASP email editing system 102 receiving an HTML email file with HTML fragments and executing a row detection task in accordance with one or more embodiments. In one or more example embodiments, the ASP email editing system 102 first determines rows of an HTML email file and then determines columns (or vice versa). In one or more example embodiments, row refers to a horizontal partition of a space (e.g., a region defined by horizontal lines) and a column refers to a vertical partition of a space (e.g., a region defined by vertical lines). In particular, the ASP email editing system 102 splits an HTML fragment horizontally to determine rows. To illustrate, the ASP email editing system 102 utilizes the structure of the HTML email file as a set of hierarchical rectangular partitions. In segmenting the HTML email structure in this manner, this aids the ASP email editing system 102 in performing an act 400 of determining rows of the HTML email file.

As mentioned, the ASP email editing system 102 performs the act 400 of determining rows or columns from an HTML email file with HTML fragments 402. In one or more example embodiments HTML fragments 402 refers to a sub-part, element, component, portion, or section of an HTML email file. In particular, an email editing application embeds HTML fragments (corresponding to email elements or components) within an HTML email file. To illustrate, the ASP email editing system 102 systematically extracts HTML fragments 402 into pre-defined email components in accordance with established hard and soft constraints. Furthermore, some common HTML fragments include text fragments, image fragments, and button fragments. An HTML text fragment includes a title or paragraph, an HTML image fragment includes an image such as a logo or a product image, and an HTML button fragment includes a short text or image that includes an URL that directs users that click on the button to a product website. As shown in FIG. 4, a received HTML email file generally includes multiple HTML fragments 402.

In one or more example embodiments, the ASP email editing system 102 determines for an HTML fragment whether it is a text fragment. In particular, the ASP email editing system 102 utilizes a hard constraint to determine whether the HTML fragment is a text fragment. To illustrate, the ASP email editing system 102 utilizes the following rule:

```
fragment(text) :- hasText, not backgroundColor(white).
```

Furthermore, the ASP email editing system 102 utilizes the above rule when the ASP email editing system 102 extracts facts from the HTML fragment that correspond with ASP atoms. In particular, the ASP email editing system 102 extracts facts that correspond with a defined ASP atom and even if the ASP email editing system 102 determines no declared background colors, the head ASP atom (e.g., Fragment(text)) is still true if another extracted fact that corresponds with an ASP atom indicates the presence of "hasText".

As just discussed, the ASP email editing system 102 receives HTML email files with HTML fragments 402 and executes a row detection task. In one or more embodiments, the ASP email editing system 102 utilizes the ASP model for executing the row detection task by establishing task and configuration constraints. In particular, task and configuration constraints include defining the triggering of certain rules and the inhibition of other rules such that the ASP email editing system 102 optimizes its results. To illustrate, a task and configuration constraint includes:

```
taskType(detectRows ;detectColumns ;detectElements).
1 {task(T): taskType(T) } 1.
```

To briefly explain the above task configuration constraint, the first part of the constraint has an input task ASP atom to declare the task and the second part controls the output. In one or more example embodiments, the ASP email editing system 102 executes a task type of "detectRows". In particular, "detectRows" causes the ASP email editing system 102 to perform a row detection routine 406. To illustrate, the row detection routine 406 detects row assignments of children nodes (i.e., HTML elements) under the HTML fragment (i.e., parent HTML node). Utilizing the ASP model, the ASP email editing system 102 optimizes the row assignments by recursively replacing the nodes in the row assignment with their descending nodes if the node is capable of being further split into more than one row. Furthermore, the ASP email editing system 102 algorithmically implies the supply of n−1 more row partitions to the parent node where n is the number of row partitions in the current node which results in the final row assignment at the root level (e.g., as shown in FIG. 4, the root level is the "4" shown in row detection routine 406).

As previously discussed in FIG. 3, the ASP email editing system 102 establishes atom definitions for facts extracted from the HTML email file such as "childrenSize(<ID>, <int>, <int>)" and "childrenPos(<id>, <int>, <int>)". In one or more example embodiments, the ASP email editing system 102 utilizes the atom definitions of childrenSize and childrenPos to perform an act 408 of determining a set of row partitions using ASP hard constraints. In particular, the ASP email editing system 102 via the ASP model detects row partitions from the HTML fragment where the ID, size, and position are defined within childrenSize and childrenPos. To illustrate, the act 408 of determining the set of row partitions utilizing ASP hard constraints includes defining ASP atoms that represent the children nodes and the row partitions to determine the number of rows from the children containers (e.g., the children nodes).

```
children(1..CID) :- CID = #max{ID: childrenPos(ID,_,_)}.
row(1..RID) :- RID = #count{ ID: children(ID) }.
```

The first line illustrates ASP hard constraints to define atoms of children nodes based on position and child ID. The second line illustrates hard constraints to define atoms representing the labels of row partitions.

Furthermore, in one or more example embodiments, the ASP email editing system 102 establishes answer specific hard constraints to perform the act 408. In particular, the ASP email editing system 102 establishes a number of rows hard constraint and an element cross-row duplication hard constraint. To illustrate, a hard constraint for a number of rows includes the hard constraint that the number of row partitions cannot exceed the number of children nodes. In addition, a hard constraint for element cross-row duplication includes the hard constraint that each child node can only belong to one row.

Moreover, the ASP email editing system 102 collects the row assignment by defining an atom rowAssignment (<CID>, <RID>) as:

```
1 { rowAssignment(CID, RID) : row(RID)} 1 :- children(CID).
```

The foregoing defines a row as including a child node within a single row. Accordingly, the ASP email editing system 102 determines a row assignment based on the children ID and the row ID and establishes the hard constraint of a children node can only belong to a single row.

In addition to defining the ASP atoms for children nodes, row partitions, and the answer specific hard constraints, the ASP email editing system 102 also establishes row specific hard constraints. In one or more example embodiments, the ASP email editing system 102 establishes an email element overlap hard constraint. In particular, the row specific constraints for email element overlap includes establishing for the ASP model events, conditions, or results that cannot occur for a row assignment. To illustrate, the ASP model includes hard constraints as prohibiting the upper row's bottom Y coordinates being greater than the lower row's top Y coordinates and the upper row's bottom Y coordinates being greater than the lower row's bottom Y coordinates. The following rules further illustrate the just mentioned email element overlap hard constraint:

```
rowAssignment(CID1, RID1), rowAssignment(CID2, RID2), CID1 !=
CID2, RID1 != RID2
childrenSize(CID1,_,H1), childrenPos(CID1,_,Y1),
childrenSize(CID2,_,H2),
childrenPos(CID2,_,Y2)
(H1+Y1) > (H2+Y2), Y2>Y1
```

The first line above establishes a rule that for a given row assignment e.g., (CID 1, RID 1) and (CID 2, RID 2), the children node IDs and row IDs cannot be equivalent to one another. The remaining rules shown in the table below establishes that the ASP model includes hard constraints as prohibiting the upper row's bottom Y coordinates being greater than the lower row's top Y coordinates and the upper row's bottom Y coordinates being greater than the lower row's bottom Y coordinates.

In one or more example embodiments, the ASP email editing system 102 utilizes the hard constraints to perform the act 408 of determining the set of row partitions. In particular, based on the aforementioned answer specific and the row specific hard constraints, the ASP model generates a set of row partition results. To illustrate, FIG. 4, shows four sets of row partitions by utilizing the hard constraints. The four sets illustrate two sets with 2 rows (with the partition at different positions), a set with 1 row, and a set with 3 rows.

As also mentioned above, the ASP email editing system 102 performs an act 410 of determining the number of row partitions in the set of row partitions. In one or more example embodiments, the ASP model of the ASP email editing system 102 selects from the determined set of row partitions to determine the number of row partitions. In particular, the ASP model defines a head atom and an objective function 412 (e.g., a function to maximize the output target) to perform the act 410 of determining the number of row partitions. To illustrate, the ASP model defines a head atom and objective function as:

```
numberOfRows(N) :- N = #count{RID: rowAssignment(_,RID)}
#maximize { N: numberOfRows(N) }.
```

In the above, the first rule counts the number of unique row IDs in the row assignment and the second rule optimizes the row assignment that results in the largest number of rows defined in the head ASP atom (i.e., numberofRows(N)).

As also mentioned, after the ASP email editing system 102 via the ASP model performs the act 410 of determining the number of row partitions in the set of row partitions, the ASP email editing system 102 performs an act 414 of determining a row detection result (e.g., utilizing an answer set solver that takes a logic program as input and generates all the answer sets of that program). In particular, the ASP email editing system 102 accounts for the objective function in determining the row detection result. To illustrate, with the determined number of row partitions discussed above, the ASP email editing system 102 selects the row partition with 3 rows because in accordance with the objective function, 3 rows is the maximum output result.

In one or more example embodiments, the ASP email editing system 102 continues executing additions row detection tasks. In particular, after row detection of the children nodes, the ASP email editing system 102 executes row detection tasks for descendants of the children nodes. However, if a detected row has more than one child node, the ASP email editing system 102 does not execute a row detection task due to the previously mentioned email element overlap constraints. To illustrate, the ASP email editing system 102 executes additional row detection tasks with the following rule:

```
Continue(CID) :- N = #count{I: rowAssignment(I,RID)},
rowAssignment(CID, RID), N <=1.
```

The above rule establishes that the i-th child appears as an answer continue(i) only if the number of rowAssignment that contains the same RID as i is greater than 1.

As further illustrated in FIG. 4, in one or more example embodiments, the ASP email editing system 102 repeats the discussed acts, but for columns 416. In particular, the ASP email editing system 102 determines columns of the HTML email file by executing a column detection task, performing a column detection routine, and determining a set of column partitions using ASP hard constraints. To illustrate, the ASP email editing system 102 utilizes the above discussed hard constraints for rows for the columns, determines the number of column partitions in the set of column partitions and utilizes an ASP objective function for determining the number of columns.

Furthermore, in addition to the above, the ASP email editing system 102 establishes rules that indicate incompatible tags to the ASP email editing system 102 for aiding in the process of converting an HTML email file for compatibility with an email editing application. For example, the ASP email editing system 102 establishes HTML specific conditions that violate email component detection tasks. In particular, for formatting within an email editing application, some applications require a specific tag. To illustrate, a <th> fragment must have a <tr> tag as its parent component. To address this potential violation, the ASP email editing system 102 declare invalidTag head with the following defined rule:

```
invalidTag :- tag(tr;th;...).
:- element(_), invalidTag.
```

Moreover, in addition to establishing constraints within ASP rules, the ASP email editing system 102 establishes constraints that apply to multiple rules. For example, the ASP email editing system 102 aggregates rules. In particular, for rules a0, a1, a2, etc., the ASP email editing system 102 aggregates these rules as j {a0, a1, . . . an}k. The just mentioned rule means at least j and at most k atoms must be true. To illustrate, the table below shows a syntax rule for when the ASP email editing system 102 restricts the editable email component class to only one class. For example, the following shows that for a given HTML fragment (e.g., fragment(F)), the ASP model limits the HTML fragment to a single class (e.g., fragmentType(F)) restricted to 1):

```
1 { fragment(F), fragmentType(F) } 1.
```

Further, the ASP email editing system 102 also utilizes aggregations such as summing and counting. In particular, the HTML email fragment may have three children's widths. To illustrate, the ASP email editing system 102 defines the children widths as childrenWidth(1, 10), childrenWidth(2, 30), and childrenWidth(1, 40). The ASP email editing system 102 defines a rule to determine the total width with the following rule:

```
totalWidth(W) :- = #sum{ CW : childrenWidth(_CW) }.
```

In the above rule, the underscore symbol implies an anonymous variable such that the rule does not constraint its value.

As previously discussed, the ASP email editing system 102 utilizes ASP soft constraints to determine editable email component classes of an HTML email file. As mentioned above, the ASP email editing system 102 performs an act of determining editable email component classes of an HTML email file by executing an element classification task, utilizing soft constraints 506 and performing an act 510 of selecting an editable email component class. As shown, the ASP email editing system 102 performs an act 502 of receiving an email file with fragments (as discussed above with regard to FIG. 4). In relation to FIG. 5, the ASP email editing system 102 further establishes/implements tasks for detecting elements:

```
0 {element(T) : elementType(T) } 1.
:- element(_), not task(detectElements).
```

The first rule above establishes that the number of element heads in the answer set is either one or nothing and the second rule establishes that any atom related to element should not appear if task(detectElements) is not declared.

As mentioned above, an execute element classification task determines for the ASP email editing system 102 the email component classes within the HTML email file. In one or more example embodiments, the ASP email editing system 102 utilizes soft constraints 506 as a scoring mechanism representing the ASP email editing system's 102 preferences for classifying email components. In particular, as previously discussed, the ASP email editing system 102 uses the sign of the weight to indicate reward or punishment. To illustrate, the ASP email editing system 102 designates a negative weight as indicating reward and a positive weight as indicating punishment. The magnitude of the weight represents the importance of the reward or punishment. The ASP email editing system 102 utilizes an ASP solver with the soft constraints to select editable email component classes.

As mentioned above, in some implementations the ASP email editing system 102 utilizes soft constraints 506 constructed from bodiless rules. In one or more example embodiments, the ASP email editing system 102 via the ASP model utilizes bodiless rules defined by ASP atoms corresponding to email component features. In particular, a bodiless rule refers to an ASP rule with no head ASP atom. Bodiless rules prevent some atoms from occurring at the same time. To illustrate, for the bodiless rule ":–a, b.", both "a and b" cannot be satisfied together. A bodiless rule acts as an integrity constraint and is the basis for the ASP email editing system 102 establishing soft constraints. As a further example of a bodiless rule, the ASP model allows for setting a feature to false when a certain tag is present. In particular, the ASP model utilizes a bodiless rule:–isElement, tag(tr), which the ASP model can establish that isElement is set to false when the tag of the current HTML fragment is "tr".

In one or more embodiments, the ASP email editing system 102 establishes bodiless rules for each editable email component class. In particular, the ASP email editing system 102 has a plurality of weights for a classification, and as discussed above, the ASP email editing system 102 totals the weights for the classification. The following is an example of a set of soft constraints for an image within an HTML fragment of an HTML email file:

```
manyImages :- numOfImages(N), N > 1.
:~ element(carousel), manyImages. [-1]
:~ element(image), manyImages. [1]
```

As an illustrative example of the foregoing soft constraints, the ASP email editing system 102 receives an HTML email file with HTML fragments and detects more than one image with an image size of width: 150, height: 100. Utilizing the above soft constraints, because the ASP email editing system 102 detects more than one image, the editable email component class of "carousel" receives a −1 and "image" receives+1 (negative is rewarded while positive is punished). As shown above, the first line establishes an atom indicating whether a fragment has "manyImages" (i.e., is associated with more than one image). The second and third lines establish that the ASP model determines a weight for the editable email component class of carousel of [−1] and a weight of [1] for an image class if an email fragment has "manyImages".

The ASP email editing system 102 can also establish additional or different soft constraints. For example, the ASP email editing system 102 can establish a size constraint (e.g., with a width and height greater than (100, 50)). The ASP email editing system 102 can indicate the weights for a carousel class and an image class. For example, because the one or more images of the HTML fragment has an image size of width: 150, height: 100, the ASP email editing system 102 editable email component class of "carousel" receives an additional −3 while "image" receives a +2. For this example, the total weight of the editable email component class "carousel" is −4 and "image" is +3. Accordingly, based on the set of soft constraints for image and carousel, the ASP email editing system 102 classifies the editable email component feature of image as "carousel."

As also previously mentioned, the ASP email editing system 102 utilizes an ASP objective function 508. In one or more example embodiments, for the soft constraints, the ASP email editing system 102 utilizes an objective function that totals the weight of the editable email component class and treats the negative weight with the greatest magnitude as the editable email component class. In particular, the ASP email editing system 102 utilizes the ASP objective function 508 for the soft constraints to perform an act 510 of selecting the editable email component class for the HTML fragment. Hence, in the above example of carousel, due to the ASP objective function 508, the ASP email editing system 102 classifies the editable email component as carousel.

Figure 5:
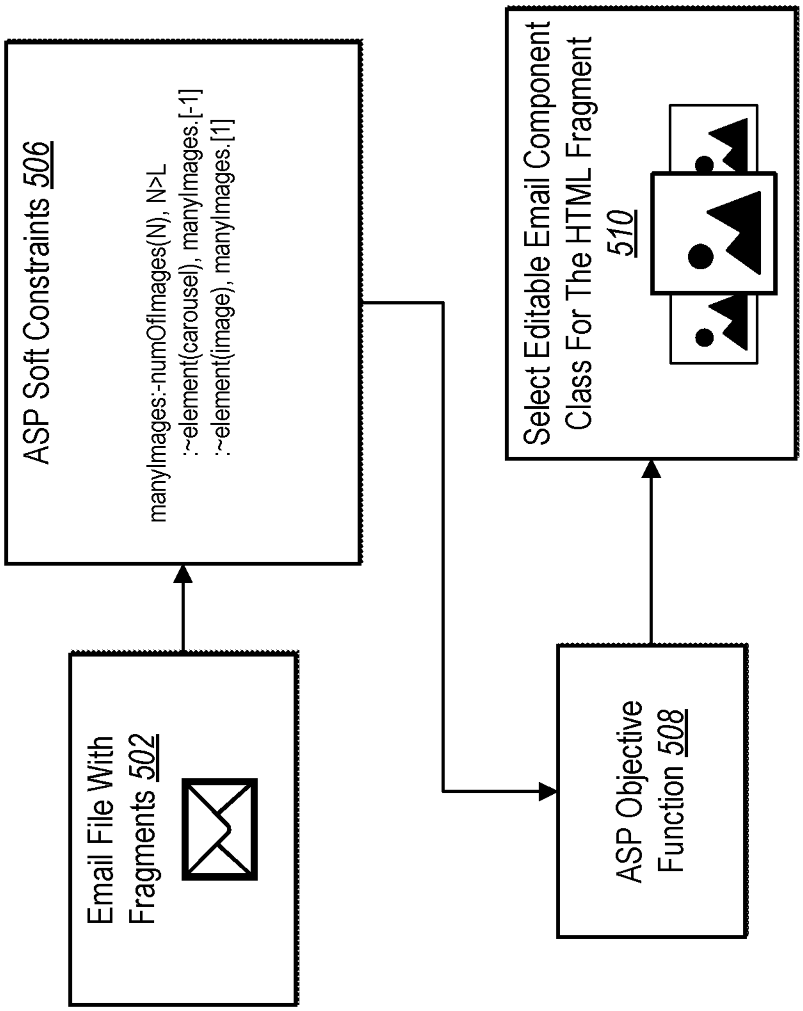
FIG. 5 illustrates a diagram of the ASP email editing system determining editable email component classes of an email file by executing an element classification task in accordance with one or more embodiments.

As shown in FIG. 5, based on the soft constraints 506 and the ASP objective function 508, the ASP email editing system 102 performs an act 510. In one or more example embodiments, the act 510 includes selecting an editable email component class for the HTML fragment. In particular, for the above-mentioned example of carousel, the ASP email editing system 102 selects carousel as the classification of the editable email component. To illustrate, the ASP email editing system 102 generates HTML tags and/or labels consistent with a carousel email component within the email editing application and provides editing functionalities for carousel to a user within the email editing application.

Figure 6:
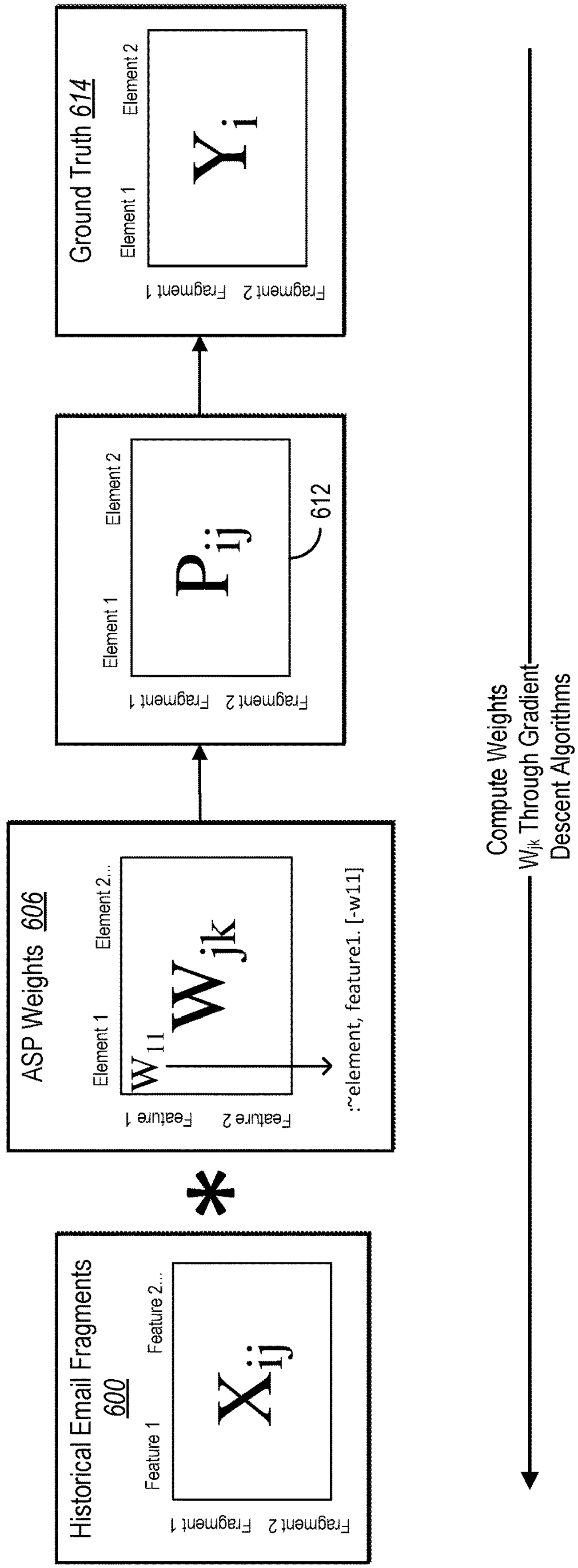
FIG. 6 illustrates a diagram of the ASP email editing system generating weights for soft constraints in an ASP email editing system model in accordance with one or more embodiments.

As mentioned previously, in some implementations the ASP email editing system 102 generates machine-learning ASP weights. As illustrated in FIG. 6, the ASP email editing system 102 trains ASP weights by utilizing historical email fragments 600, (predicted) ASP weights 606, and a ground truth 614. In one or more example embodiments, the ASP email editing system 102 generates a set of ASP soft constraints of an ASP model for detecting email component elements in one or more incompatible email files. In particular, the generated set of ASP soft constraints of the ASP model includes developer input of the weights. To illustrate, a developer of the ASP model determines that the weight of a carousel class is −1 and the weight of an image class is +1. The below discussion further outlines training/generating an ASP weight for an editable email component class within the ASP email editing system 102.

In one or more example embodiments, generating a set of ASP soft constraints of the ASP model includes generating additional sets of ASP soft constraints. In particular, the ASP email editing system 102 generates a first and second soft constraint corresponding to the same editable email component class. To illustrate, the ASP email editing system 102 generates a first ASP soft constraint with a first bodiless rule for a first editable email component class defined by a first ASP atom corresponding to a first email component feature. Further, the ASP email editing system 102 generates a second ASP soft constraint with a second bodiless rule for the first editable email component class defined by a second ASP atom corresponding to a second email component feature.

As an example of the above, the ASP email editing system 102 generates a first soft constraint when the number of images is greater than 1 of weighing the carousel class as [−1]. In this example, the first bodiless rule includes ":— element(carousel), manyImages. [−1]" for the first editable email component class "carousel" defined by a first ASP atom manyImages. Further, the ASP email editing system 102 generates a second ASP soft constraint when the size of the image exceeds a width and height of (100, 50) (e.g., a weight of −3) for the first editable email component class "carousel" defined by a second ASP atom.

Moreover, in another example embodiment, the ASP email editing system 102 generates a third ASP soft constraint. In particular, the ASP email editing system 102 generates a third ASP soft constraint for a second editable email component class. To illustrate, the ASP email editing system 102 generates a third ASP soft constraint with a third bodiless rule for a second editable email component class defined by a third ASP atom corresponding to a third email component feature. The ASP email editing system 102, in one or more embodiments, generates sets of ASP soft constraints with corresponding ASP weights for each of the editable email components. For example, the ASP email editing system 102 generates the third ASP soft constraint when a fragment contains text (e.g., with a weight of +2).

As just mentioned, the ASP email editing system 102 generates a set of soft constraints. In one or more example embodiments, and as shown in FIG. 6, in addition to generating the set of soft constraints, the ASP email editing system 102 receives samples to further train the ASP model for the ASP weights associated with the soft constraints. In particular, the samples include training samples such as training HTML email fragments, features corresponding to the training HTML email fragments, and ground truth component classes corresponding to the training HTML email fragments.

In one or more example embodiments, the ASP email editing system 102 utilizes HTML labels for the historical email fragments 600. In particular, an HTML label refers to HTML markup language to indicate an HTML element or fragment. For example, a label can indicate a class of an email element and the beginning/ending of the element. To illustrate, a label can include all or a portion of an HTML tag. In some implementations the HTML labels provide web browsers with the visual makeup of HTML email files as seen by a receiving user of an HTML email file.

In other instances, the ASP email editing system 102 utilizes historical email fragments 600 to train the machine learning ASP weights with HTML labels and available email inventory. In particular, historical email fragments include available inventory emails with known observable HTML email components. In particular, historical email fragments generally already have an as signed HTML label that indicate a class. To illustrate, HTML email fragments from the historical email fragments 600 includes classes such as "btn" or "image" in their HTML labels.

As mentioned above, the ASP email editing system predicts classes for an HTML fragment by utilizing bodiless rules defined by ASP atoms corresponding to an email component feature. In one or more example embodiments, HTML features includes attributes of an HTML email file. In particular, features include HTML fragments having text, having a particular title font, having an image, and the size of the image. To illustrate, feature syntax includes for example "hasImage," "hasText," and "hasTitleFont."

As mentioned above, the ASP email editing system receives training samples with ground truth component classes corresponding to training HTML email fragments. In one or more example embodiments, ground truth component classes refer to a known observation or result for the class of an email component. In particular, the ASP email editing system utilizes the ground truth component classes to train machine-learning ASP weights. To illustrate, ground truth component classes include for an HTML email file a known result such as a number of rows or columns or an editable email component class type.

Furthermore, after the ASP email editing system 102 receives/identifies training samples, the ASP email editing system 102 trains the ASP weights for the ASP model. In one or more example embodiments, the ASP email editing system 102 trains machine-learning ASP weights of ASP soft constraints. In particular, the ASP email editing system 102 trains the machine-learning ASP weights to predict editable email component classes from one or more incompatible HTML email files. To illustrate, the ASP email editing system 102 utilizes the above-discussed training HTML email fragments, HTML features, and ground truth component classes to train the machine-learning ASP weights.

In one or more example embodiments, the ASP email editing system 102 learns different weights for different ASP soft constraints. In particular, the ASP email editing system 102 learns a first machine-learning ASP weight for the first ASP soft constraint and a second machine-learning ASP weight for the second ASP soft constraint. To illustrate, the ASP email editing system 102 generates an initial set of machine-learning ASP weights for each of the ASP soft constraints and predicted editable email component classes for the features corresponding to the training HTML email fragments. Moreover, the ASP email editing system 102 compares the predicted editable email component classes to the ground truth component classes corresponding to the training HTML email fragments and modifies the initial set of machine learning ASP weights by comparing the ground truth component classes and the predicted editable email component classes.

As discussed above, the ASP email editing system 102 utilizes machine learning to train the ASP model. In one or more example embodiments, the ASP email editing system 102 utilizes a multiclass logistics regression model. In particular, the ASP email editing system 102 utilizes the multiclass logistics regression model for determining the editable email component classes of the HTML email file through gradient descent algorithms. To illustrate, the ASP email editing system 102 utilizes a set of classes (e.g., $Y=\{y_1, y_2 \ldots\}$ where $y_1$ represents element(text) and $y_2$ represents element(image). Further, the ASP email editing system 102 utilizes a set of features derived from the HTML fragment as a feature vector (e.g., $X=x_1, x_2 \ldots\}$ where $x_1$ represents manyImages and $x_2$ represents hasText. The resulting class i is derived from the vector sets:

$$\mathrm{argmin}_i x^T w_i$$

In the above equation, $w_i$ represents the weights associated with the soft constraints related to the class. The multiclass logistics regression model discussed above further improves the settings of the derived weights by learning weights through data. As shown in FIG. 6, in one or more example embodiments, the ASP email editing system 102 utilizes a gradient descent algorithm. In particular, the ASP email editing system 102 maps the HTML fragments from the training samples individually to ASP atoms and counts the features the ASP atoms satisfy. To illustrate, the ASP email editing system 102 transforms the counts from all the training samples into an i×j matrix X (in the historical email fragments 600 diagram box) where i is the number of samples and j is the number of features defined in the ASP model. Furthermore, the HTML labels from the historical email fragments is transformed to vector $Y_i$ (ground truth 614 diagram box). From the soft constraints, the weights to be incorporated 606 (W) in the ASP email editing system 102 can form a j×k matrix where k is the number of email elements available in the email editing application (j is the number of features defined in the ASP model). Utilizing the three matrices of X, W, and Y, the ASP utilizes a multiclass logistics regression model to compute matrix 612 ($P_{ij}$) (e.g., the values of weights W* through a gradient descent algorithm).

In addition to utilizing a multiclass logistics regression model through a gradient descent algorithm to compute weights of different editable email component classes, the ASP email editing system 102 utilizes non-linear models. For example, the ASP email editing system 102 can utilize a non-linear model such as a neural network or a random forest model. In one or more embodiments, a machine learning model refers to a computer representation that can be tuned (e.g., trained) based on inputs to approximate unknown functions. In particular, in some embodiments, a machine learning model refers to a model that utilizes algorithms to learn from, and make predictions on, known data by analyzing the known data to learn to generate outputs that reflect patterns and attributes of the known data. For instance, in some instances, a machine learning model includes, but is not limited to a neural network (e.g., a convolutional neural network, recurrent neural network or other deep learning network), a decision tree (e.g., a gradient boosted decision tree), support vector learning, or Bayesian network.

Accordingly, the ASP email editing system 102 can utilize machine learning principles to improve upon the accuracy of determining weights associated with different editable email component classes. The below example illustrates a weight associated with an editable email component class by the ASP email editing system 102 prior to training and a weight associated with the editable email component class after training:

```
:~ soft(hasText), element(text). [-1] → [-4]
:~ soft(longParagraph), element(text). [-1] → [-21]
:~ soft(shortParagraph), element(text). [1] → [14]
:~ soft(hasHref), element(button). [-1] → [-26]
:~ soft(lightColorText), element(button). [-1] → [-10]
:~ soft(smallText), element(button). [-2] → [-5]
:~ soft(largeComponent), element(button). [2] → [2]
```

In addition to just discussed advantages of utilizing machine-learning to improve the accuracy of the ASP weights, the ASP email editing system also has additional efficiency, flexibility, and accuracy advantages. To illustrate with the above discussed principles in mind, for a third-party HTML email file, the ASP email editing system 102 receives the following button HTML fragment compiled into a set of facts and constraints:

```
task(Detectelement). width(148). height(28). fontsize(18). borderWidth(4).
textColor(255, 255, 255). urlLength(1). tag(div). tag(a). tag(span).
numberOfTexts(2).
```

The ASP email editing system receives the above HTML fragment (and corresponding atoms populated with facts) and utilizes the ASP model with the hard constraints, soft constraints, and trained machine-learning ASP weights to return the following answer set:

```
Fact(smallComponent) fact(hasBorder) fact(hasText) fact(smallText)
fact(lightColorText)
element(button)
```

Thus, the ASP email editing system 102 classifies the fragment as an element button utilizing the ASP model. Moreover, the ASP email editing system 102 provides an easy to understand and efficient component detection. In particular, the ASP email editing system, by utilizing an ASP model for email component detection shows the logic behind a detected component with short and concise statements which allows for a developer of the ASP email editing system 102 to inspect and debug any output efficiently, flexibly, and accurately.

Figure 7A:
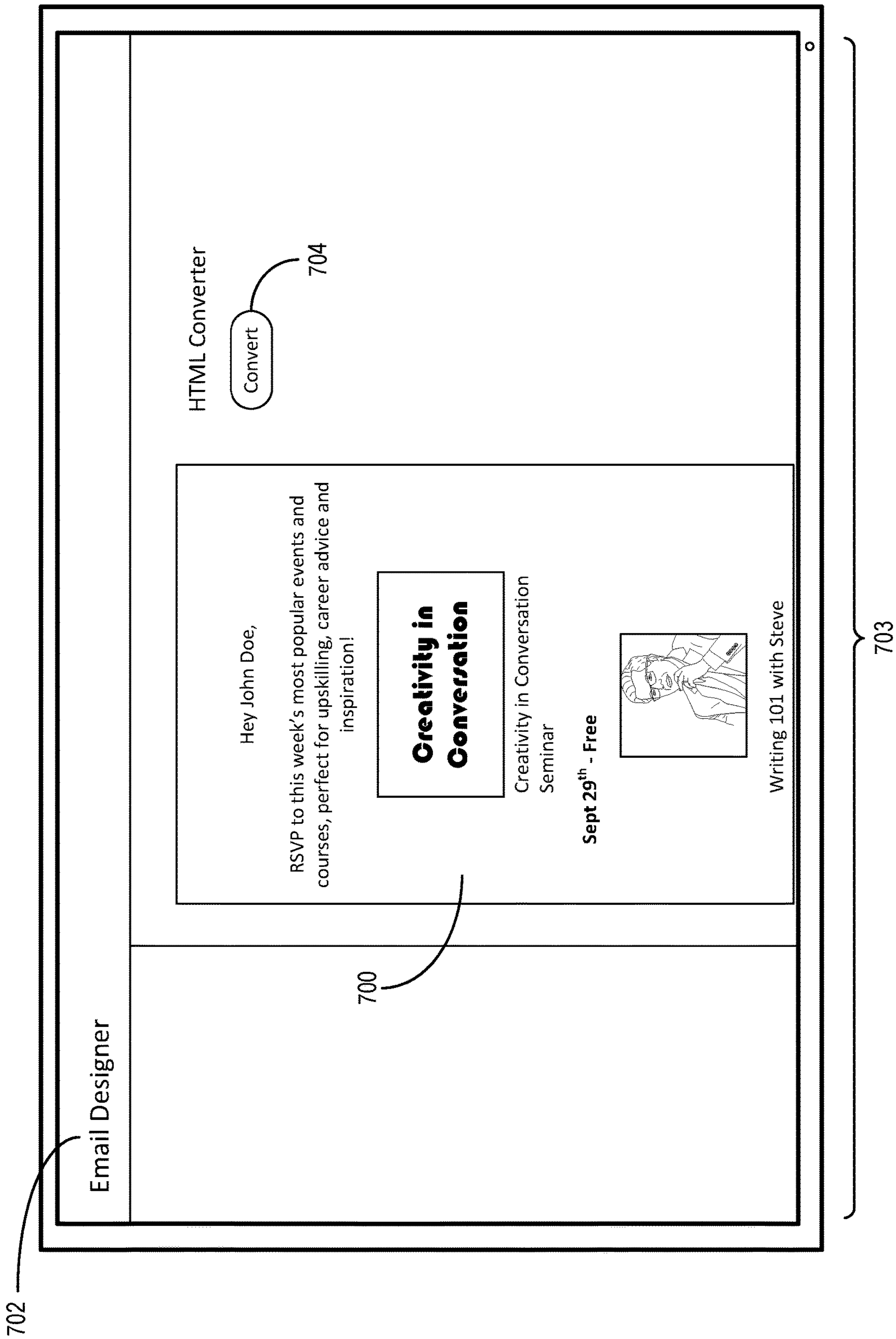
FIGS. 7A-7B illustrates a diagram of the ASP email editing system converting an email file to an editable email with editable email components, in accordance with one or more embodiments.
Figure 7B:
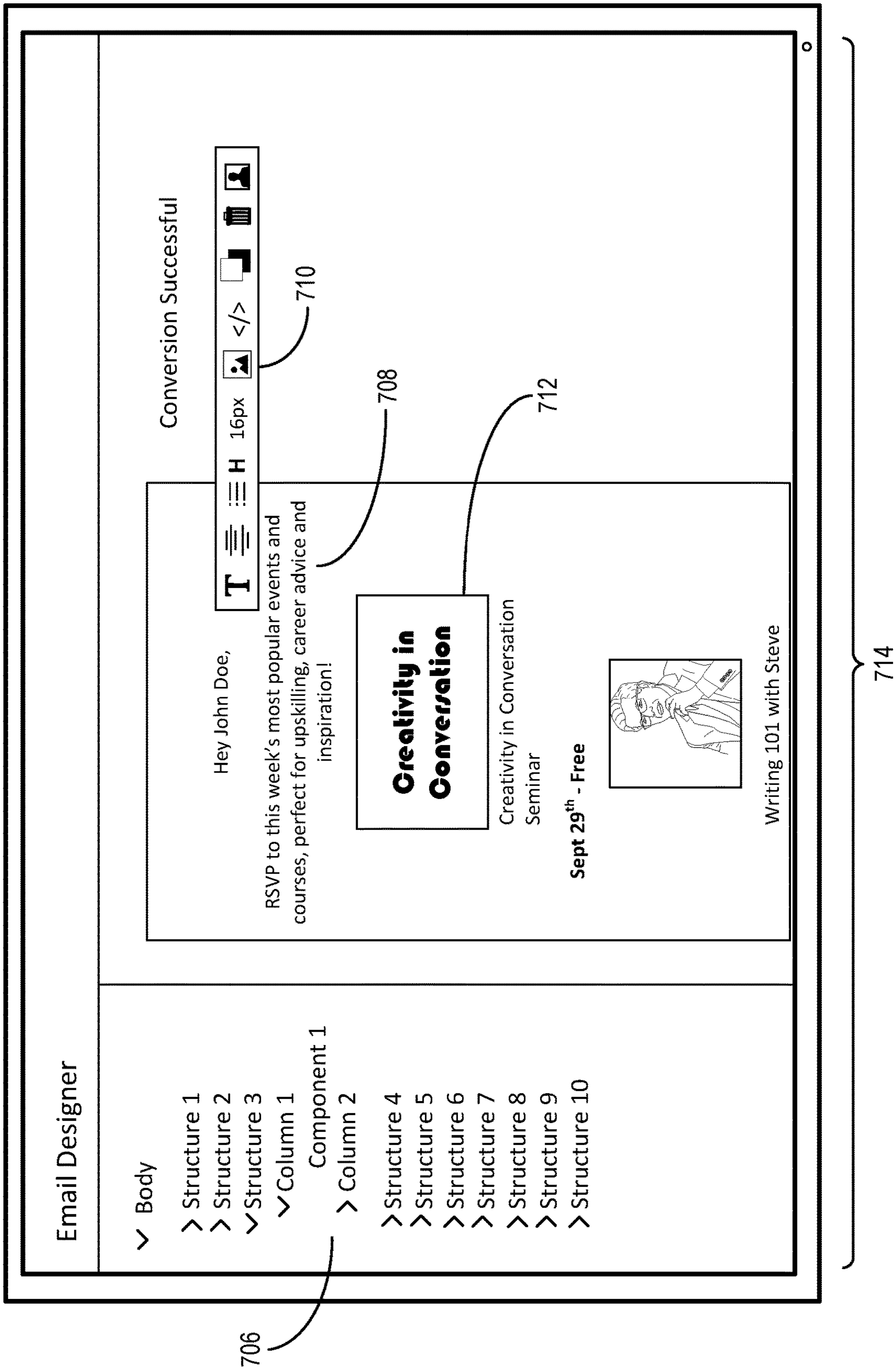

As mentioned above, the ASP email editing system can convert an HTML email file for use in an email editing application. FIGS. 7A-7B shows more details of user interfaces generated by the ASP email editing system 102 in converting an HTML email file in accordance with one or more embodiments. For example, FIG. 7A illustrates an email file 700 within an email editing application 702 displayed via a graphical user interface 703. In particular, the email file 700 shows a variety of elements such as text elements and image elements. Furthermore, FIG. 7A shows a selection 704 of the convert option. Indeed, the selection 704 of the convert option causes the ASP email editing system 102 to perform the actions and principles discussed above via an ASP model to detect rows, columns, and editable email component classes.

As further illustrated by FIG. 7B, the conversion of the email file 700 results in the email editing application 702 providing an editable email with editable email components via a graphical use interface 714. For example, FIG. 7B illustrates the user interface 714 displaying a hierarchical structure 706 of the email file 700. In particular, the hierarchical structure 706 shows the various rows and columns in the email file 700 for editing. Furthermore, the hierarchical structure 706 also shows sub-components of rows or columns for detected editable email components.

Moreover, FIG. 7B shows a text element 708 and an image element 712. For example, FIG. 7B shows a selection of the text element 708. In particular, in response to a selection of the text element 708, the ASP email editing system 102 provides editing options 710 such as bolding, italicizing, formatting, and changing the font size of the text within the text element. Additionally, upon selection of the image element 712 the ASP email editing system 102 similarly provides editing options 710 for the image within the image element 712.

Figure 8:
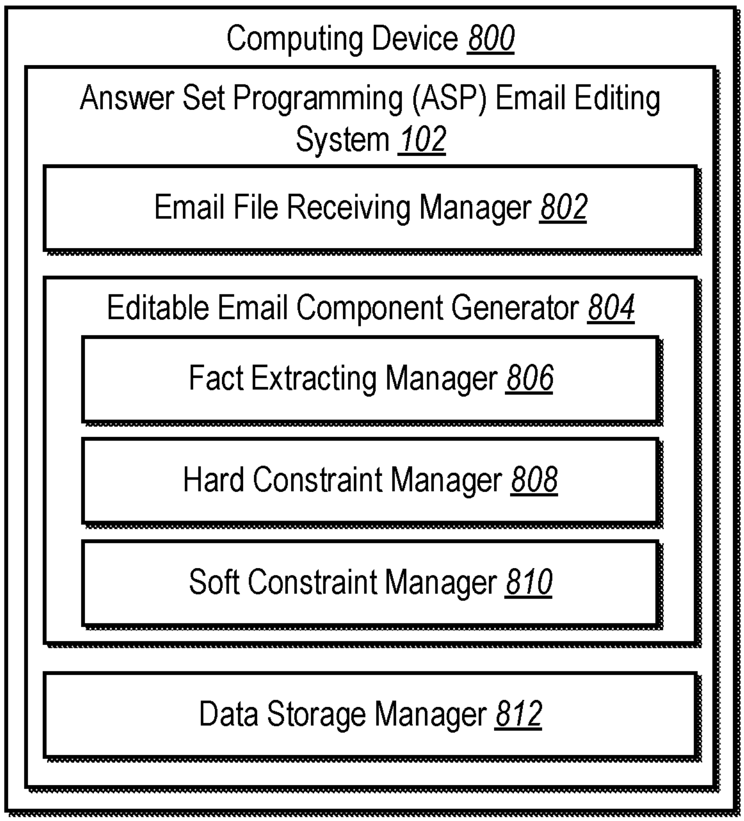
FIG. 8 illustrates an example schematic diagram of an ASP email editing system in accordance with one or more embodiments.

Turning to FIG. 8, additional detail will now be provided regarding various components and capabilities of the ASP email editing system 102. In particular, FIG. 8 illustrates an example schematic diagram of a computing device 800 (e.g., the server(s) 106 and/or the client device 112) implementing the ASP email editing system 102 in accordance with one or more embodiments of the present disclosure for components 802-812. As illustrated in FIG. 8, the ASP email editing system 102 includes an email file receiving manager 802, an editable email component generator 804, a fact extracting manager 806, a hard constraint manager 808, a soft constraint manager 810, and a data storage 812.

The email file receiving manager 802 receives, transmits, and/or stores HTML email files. For example, the email file receiving manager 802 receives HTML email files from an email editing application via a user upload of an HTML email file from a different email editing application. The email file receiving manager 802 can also receive additional input besides the HTML email file from a user of the application, such as to receive additional files or to perform an action on the HTML email file. As mentioned above, the email file receiving manager 802 receives files for further utilization within the ASP email editing system 102.

The editable email component generator 804 generates editable email components of the received HTML email file. For example, the editable email component generator 804 receives a trigger to convert an unstructured HTML email file for determining rows, columns, and editable email component classes. In receiving a trigger to convert the unstructured HTML email file, the editable email component generator 804 utilizes the ASP model to make the aforementioned determinations.

The editable email component generator 804 also contains sub-components as illustrated in FIG. 8. The fact extracting manager 806 extracts facts from an HTML email file. For example, the fact extracting manager 806 can extract facts from the HTML specification of the HTML email file, render the HTML email file in a browser and extract facts, or user computer vision libraries to extract facts such as colors.

The hard constraint manager 808 determines, establishes, and applies hard constraints within the ASP model of the ASP email editing system 102. For example, the hard constraint manager 808 utilizes the hard constraints to determine rows or columns within the HTML email file, as described above. Furthermore, the soft constraint manager 810 determines, establishes, and applies soft constraints within the ASP model of the ASP email editing system 102. For example, the soft constraint manager 810 applies soft constraints to determine editable email component classes within an HTML email file, as described above.

As shown in FIG. 8, the ASP email editing system 102 also includes data storage 812. In particular, data storage 812

(implemented by one or more memory devices) can include email files, email fragments, editable email components, editable email component classes, and/or facts extracted from email files.

Each of the components 802-812 of the ASP email editing system 102 can include software, hardware, or both. For example, the components 802-812 can include one or more instructions stored on a computer-readable storage medium and executable by processors of one or more computing devices, such as a client device or server device. When executed by the one or more processors, the computer-executable instructions of the ASP email editing system 102 can cause the computing device(s) to perform the methods described herein. Alternatively, the components 802-812 can include hardware, such as a special-purpose processing device to perform a certain function or group of functions. Alternatively, the components 802-812 of the ASP email editing system 102 can include a combination of computer-executable instructions and hardware.

Furthermore, the components 802-812 of the ASP email editing system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-812 of the ASP email editing system 102 may be implemented as a stand-alone application, such as a desktop or mobile application. Furthermore, the components 802-812 of the ASP email editing system 102 may be implemented as one or more web-based applications hosted on a remote server. Alternatively, or additionally, the components 802-812 of the ASP email editing system 102 may be implemented in a suite of mobile device applications or "apps." For example, in one or more embodiments, the ASP email editing system 102 can comprise or operate in connection with digital software applications such as ADOBE® EXPERIENCE CLOUD and/or JOURNEY OPTIMIZER. The foregoing are either registered trademarks or trademarks of Adobe Inc. in the United States and/or other countries.

Figure 9:
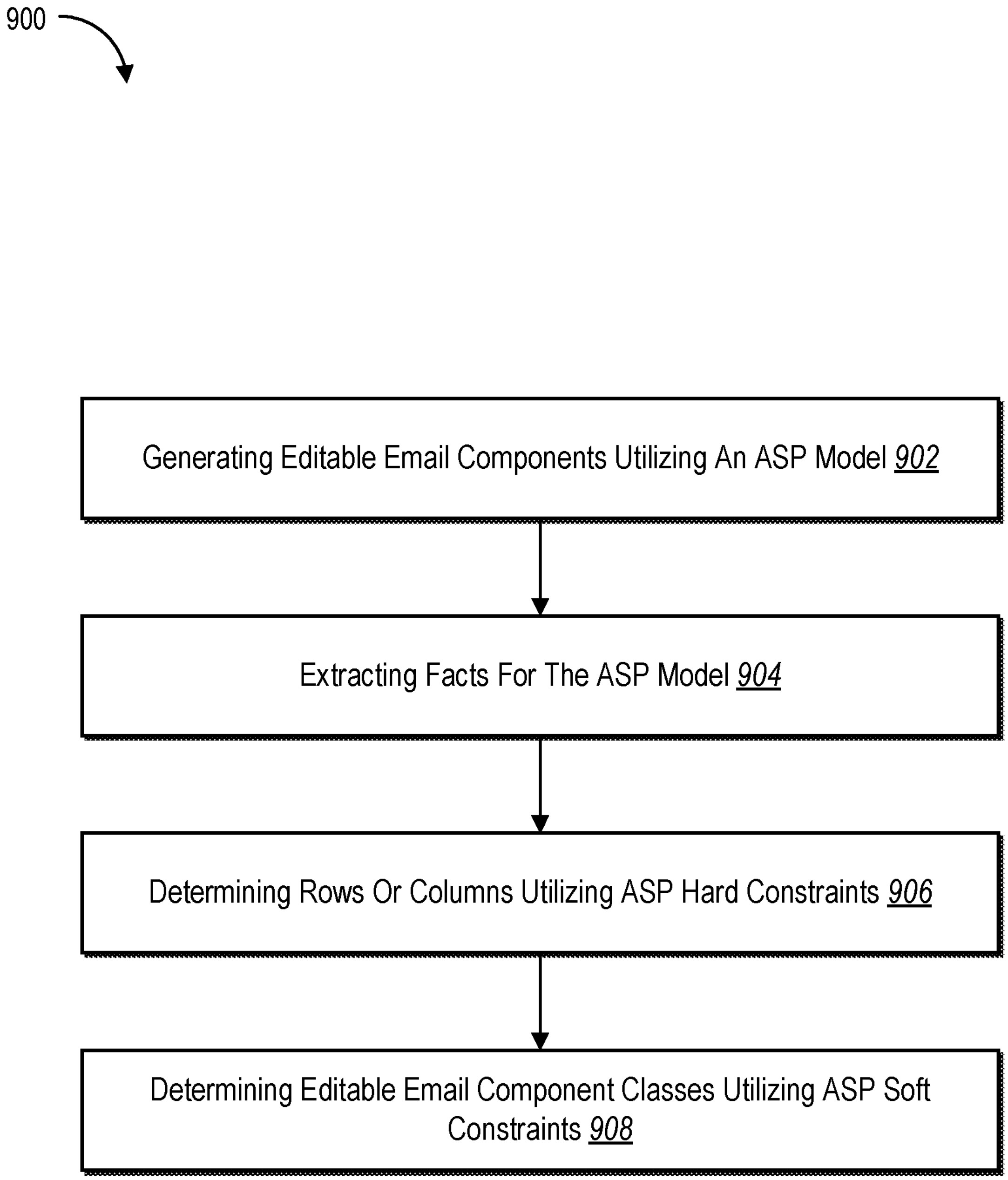
FIG. 9 illustrates a flowchart of a series of acts for generating editable email components from email fragments in accordance with one or more embodiments.

FIGS. 1-8, the corresponding text, and the examples provide a number of different methods, systems, devices, and non-transitory computer-readable media of the ASP email editing system 102. In addition to the foregoing, one or more embodiments can also be described in terms of flowcharts comprising acts for accomplishing the particular result, as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

FIG. 9 illustrates a flowchart of a series of acts 900 for generating editable email components from the HTML fragments utilizing an ASP model in accordance with one or more embodiments. FIG. 9 illustrates acts according to one embodiment, alternative embodiments may omit, add to, reorder, and/or modify any of the acts shown in FIG. 9. In some implementations, the acts of FIG. 9 are performed as part of a method. For example, in some embodiments, the acts of FIG. 9 are performed as part of a computer-implemented method. Alternatively, a non-transitory computer-readable medium can store instructions thereon that, when executed by at least one processor, cause a computing device to perform the acts of FIG. 9. In some embodiments, a system performs the acts of FIG. 9. For example, in one or more embodiments, a system includes at least one memory device comprising a global recommendation model corresponding to a plurality of users of a suite of software applications and a recommendation personalization model corresponding to personal preferences of a user of the suite of software applications. The system further includes at least one server device configured to cause the system to perform the acts of FIG. 9.

The series of acts 900 includes an act 902 of generating editable email components utilizing an ASP model. The act 902 includes, generating editable email components from the HTML fragments utilizing an Answer Set Programming (ASP) model. In one or more example embodiments, the act 902 also includes identifying incompatible labels for the email fragments corresponding to the first email editing application from the email file, upon determining the editable email component classes, generating labels for the email fragments compatible with the second email editing application, and replacing the incompatible labels with labels compatible with the second email editing application to generate the editable email components. In addition, the act 902 includes selecting the first editable email component class for the first email fragment utilizing an ASP objective function based on the first weight for the first editable email component class and the second weight for the second editable email component class.

The series of acts 900 also includes an act 904 of extracting facts for the ASP model. The act 904 includes extracting facts for the ASP model from the email file. To illustrate, the act 904 includes determining the facts based on an embedded style sheet of the email file, determining fragment width, height, or position from a browser rendering of the email file, or extracting colors or fonts from the email file utilizing a computer vision library.

Further, the series of acts 900 includes an act 906 of determining rows or columns utilizing ASP hard constraints. The act 906 includes determining rows or columns defining cells of the email file utilizing ASP hard constraints defined by a first set of ASP atoms corresponding to the facts. The act 906 further includes determining a set of row partition results utilizing the ASP hard constraints, determining numbers of row partitions in the set of row partition results utilizing a head ASP atom, and selecting rows defining the cells of the email file utilizing an ASP objective function based on the head ASP atom.

Additionally, the act 906 includes determining the set of row partition results utilizing the ASP hard constraints comprises determining the set of row partition results by utilizing the ASP model to search for possible row partitions subject to the ASP hard constraints, wherein the ASP hard constraints comprise at least one of: a number of rows hard constraint, an email element overlap hard constraint, or an element cross-row duplication hard constraint. Moreover, the act 906 includes determining a set of row partition results utilizing the ASP hard constraints and selecting rows defining the cells of the email file utilizing an ASP objective function based on the set of row partition results.

The series of acts 900 includes an act 908 of determining editable email component classes utilizing ASP soft constraints. The act 908 includes determining editable email component classes for the fragments utilizing ASP soft constraints defined by ASP classification weights and a second set of ASP atoms corresponding to the facts. Furthermore, the act 908 also includes executing an element classification task of the ASP model by, for a first ASP soft constraint, determining a first weight for an editable email component class of an email fragment of the email file utilizing a first bodiless rule defined by a first ASP atom corresponding to a first email component feature and a first ASP classification weight.

The act 908 also includes determining a second weight for the editable email component class of the fragment of the email file utilizing a second bodiless rule defined by a second ASP atom corresponding to a second email component feature and a second ASP classification weight. In addition, the act 908 includes selecting the editable email component class for the email fragment utilizing an ASP objective function based on the first weight and the second weight. Moreover, the act 908 includes for a first ASP soft constraint, determining a first weight for a first editable email component class of a first email fragment of the email file utilizing a first bodiless rule defined by a first ASP atom corresponding to a first email component feature and a first ASP classification weight and for a second ASP soft constraint, determining a second weight for a second editable email component class of the first email fragment of the email file utilizing a second bodiless rule defined by a second ASP atom corresponding to a second email component feature and a second ASP classification weight.

In one or more embodiments, the ASP email editing system 102, for the series of acts 900 performs the acts of providing the editable email components, for display, via an email editing user interface of the second email editing application, the email editing user interface comprising one or more cell elements based on the cells and one or more editing options based on the editable email component classes. In other instances, the series of acts 900 further comprises converting the email fragments to editable email components within the second email editing application based on the editable email component classes.

Figure 10:
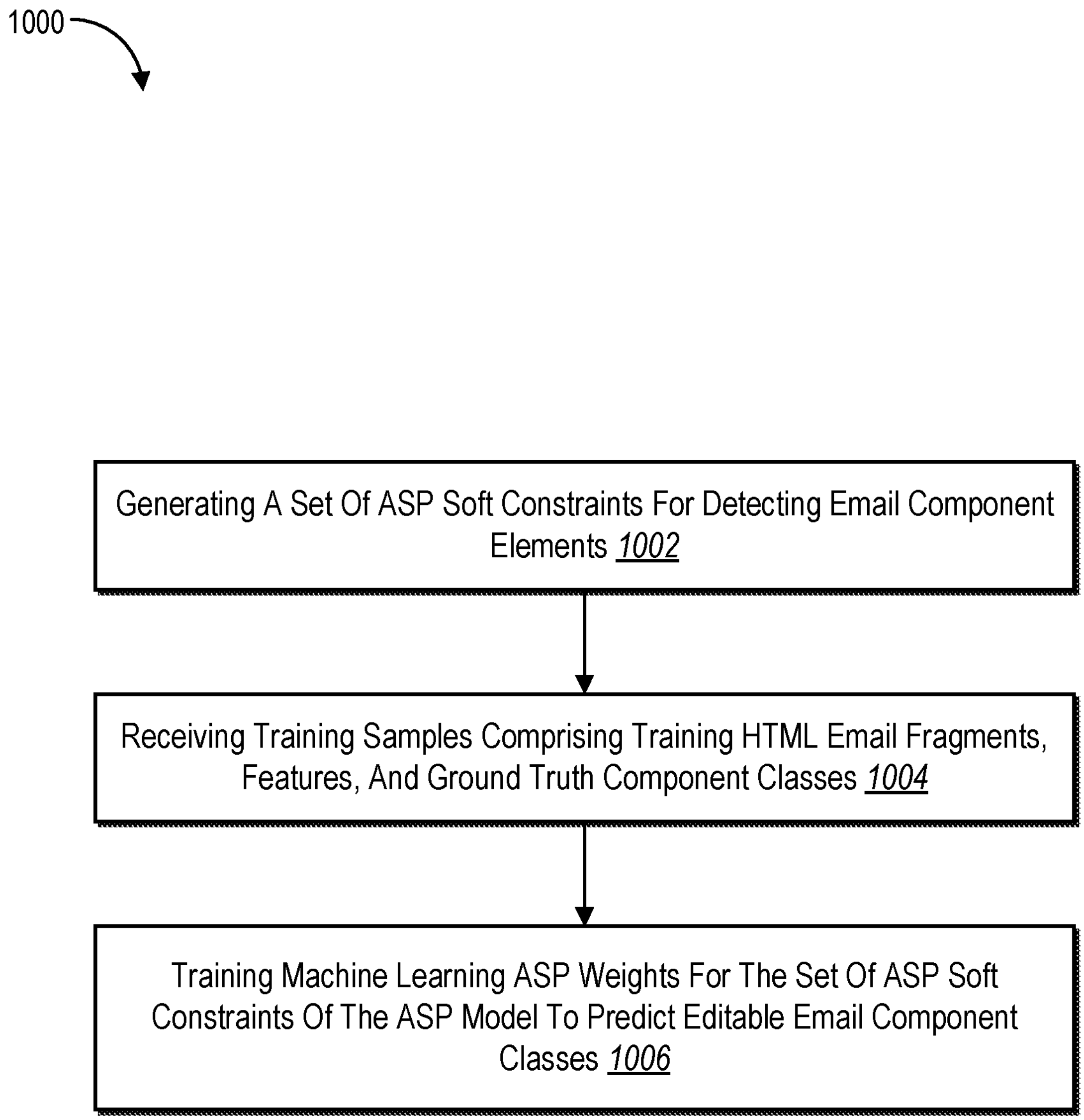
FIG. 10 illustrates a flowchart of a series of acts for training machine learning ASP weights in accordance with one or more embodiments.

FIG. 10 may be performed with more or fewer acts. Further, the acts may be performed in different orders. Additionally, the acts described herein may be repeated or performed in parallel with one another or in parallel with different instances of the same or similar acts. FIG. 10 illustrates a flowchart of a series of acts 1000 for training machine learning ASP weights for the set of ASP soft constraints in accordance with one or more embodiments. FIG. 10 illustrates acts according to one embodiment, alternative embodiments may omit, add to, reorder, and/or modify any of the acts shown in FIG. 10. In some implementations, the acts of FIG. 10 are performed as part of a method. For example, in some embodiments, the acts of FIG. 10 are performed as part of a computer-implemented method. Alternatively, a non-transitory computer-readable medium can store instructions thereon that, when executed by at least one processor, cause a computing device to perform the acts of FIG. 10. In some embodiments, a system performs the acts of FIG. 10. For example, in one or more embodiments, a system includes at least one memory device comprising a global recommendation model corresponding to a plurality of users of a suite of software applications and a recommendation personalization model corresponding to personal preferences of a user of the suite of software applications. The system further includes at least one server device configured to cause the system to perform the acts of FIG. 10.

The series of acts 1000 includes an act 1002 generating a set of ASP soft constraints for detecting email component elements. For example, the act 1002 includes generating a set of ASP soft constraints of an ASP model for detecting email component elements in one or more email files. The act 1002 further includes generating a first ASP soft constraint comprising a first bodiless rule for a first editable email component class defined by a first ASP atom corresponding to a first email component feature and generating a second ASP soft constraint comprising a second bodiless rule for the first editable email component class defined by a second ASP atom corresponding to a second email component feature. In addition, the act 1002 includes learning a first machine-learning ASP weight for the first ASP soft constraint and a second machine-learning ASP weight for the second ASP soft constraint. Moreover, the act 1002 includes generating a third ASP soft constraint comprising a third bodiless rule for a second editable email component class defined by a third ASP atom corresponding to a third email component feature.

In addition, the series of acts 1000 includes an act 1004 of receiving training samples comprising training email fragments, features, and ground truth component classes. For example, the act 1004 includes receiving training samples comprising training email fragments, features corresponding to the training email fragments, and ground truth component classes corresponding to the training HTML email fragments.

The series of acts 1000 includes an act 1006 of training machine learning ASP weights for the set of ASP soft constraints of the ASP model to predict editable email component classes. For example, the act 1006 includes training machine-learning ASP weights for the set of ASP soft constraints of the ASP model to predict editable email component classes from the one or more incompatible HTML email files based on the training email fragments, the features, and the ground truth component classes. The act 1006 includes utilizing gradient descent to learn a first machine-learning ASP weight for the first ASP soft constraint, a second machine-learning ASP weight for the second ASP soft constraint, and a third machine-learning ASP weight for the third ASP soft constraint. Additionally, the act 1006 includes generating, utilizing an initial set of machine-learning ASP weights, predicted editable email component classes from the features corresponding to the training email fragments, comparing the predicted editable email component classes to the ground truth component classes corresponding to the training email fragments, and modifying the initial set of machine-learning ASP weights by comparing the ground truth component classes and the predicted editable email component classes.

In addition to the series of acts 1000, the ASP email editing system 102 performs an act of generating a set of ASP hard constraints of the ASP model for detecting rows or columns in one or more email files, wherein the set of ASP hard constraints comprises at least one of: a number of rows hard constraint, an email element overlap hard constraint, or an element cross-row duplication hard constraint.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
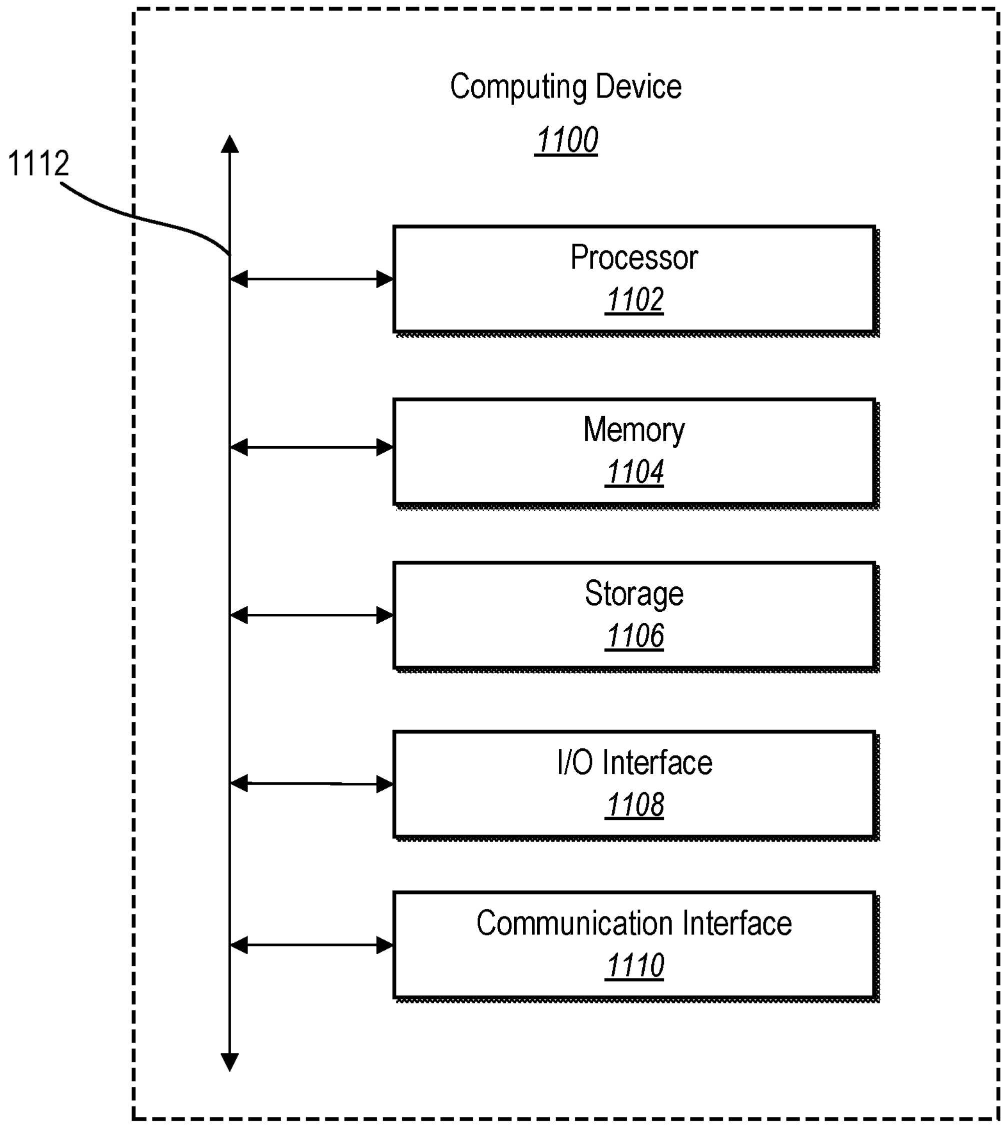
FIG. 11 illustrates a block diagram of an exemplary computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., the server(s) 106 and/or the client device 112). In one or more embodiments, the computing device 1100 may be a mobile device (e.g., a mobile telephone, a smartphone, a PDA, a tablet, a laptop, a camera, a tracker, a watch, a wearable device). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 including storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:

receiving a hypertext markup language (HTML) email file comprising HTML fragments generated utilizing a first email editing application; and generating editable email components from the HTML fragments for editing by a second email editing application incompatible with the first email editing application utilizing an Answer Set Programming (ASP) model by:

extracting facts for the ASP model from the HTML email file;

determining rows or columns defining cells of the HTML email file utilizing ASP hard constraints defined by a first set of ASP atoms corresponding to the facts;

determining editable email component classes for the HTML fragments utilizing ASP soft constraints defined by ASP classification weights and a second set of ASP atoms corresponding to the facts; and generating the editable email components from the rows or columns defining the cells of the HTML email file and from the editable email component classes for the HTML fragments.

2. The method of claim 1, wherein extracting the facts for the ASP model from the HTML email file further comprises at least one of:

determining the facts based on an embedded style sheet of the HTML email file, determining fragment width, height, or position from a browser rendering of the HTML email file, or extracting colors or fonts from the HTML email file utilizing a computer vision library.

3. The method of claim 1, wherein the HTML email file is generated utilizing the first email editing application and further comprising generating the editable email components from the HTML email file for editing by the second email editing application by:

identifying incompatible labels for the HTML fragments corresponding to the first email editing application from the HTML email file;

upon determining the editable email component classes, generating labels for the HTML fragments compatible with the second email editing application; and replacing the incompatible labels with labels compatible with the second email editing application to generate the editable email components.

4. The method of claim 1, wherein determining the rows or columns defining the cells of the HTML email file utilizing the ASP hard constraints comprises executing a row detection task of the ASP model by:

determining a set of row partition results utilizing the ASP hard constraints;

determining numbers of row partitions in the set of row partition results utilizing a head ASP atom; and selecting rows defining the cells of the HTML email file utilizing an ASP objective function based on the head ASP atom.

5. The method of claim 4, wherein determining the set of row partition results utilizing the ASP hard constraints comprises determining the set of row partition results by utilizing the ASP model to search for possible row partitions subject to the ASP hard constraints, wherein the ASP hard constraints comprise at least one of: a number of rows hard constraint, an email element overlap hard constraint, or an element cross-row duplication hard constraint.

6. The method of claim 1, wherein determining editable email component classes utilizing the ASP soft constraints comprises executing an element classification task of the ASP model by, for a first ASP soft constraint, determining a first weight for an editable email component class of an email fragment of the HTML email file utilizing a first bodiless rule defined by a first ASP atom corresponding to a first email component feature and a first ASP classification weight.

7. The method of claim 6, wherein executing the element classification task of the ASP model further comprises for a second ASP soft constraint, determining a second weight for the editable email component class of the email fragment of the HTML email file utilizing a second bodiless rule defined by a second ASP atom corresponding to a second email component feature and a second ASP classification weight.

8. The method of claim 7, wherein executing the element classification task of the ASP model further comprises selecting the editable email component class for the email fragment utilizing an ASP objective function based on the first weight and the second weight.

9. The method of claim 1, further comprising providing the editable email components, for display, via an email editing user interface of a second email editing application, the email editing user interface comprising one or more cell elements based on the cells and one or more editing options based on the editable email component classes.

10. A non-transitory computer-readable medium storing executable instructions which, when executed by at least one processing device, cause the at least one processing device to perform operations comprising:

receiving an HTML email file comprising HTML fragments generated utilizing a first email editing application; and generating editable email components from the HTML fragments by a second email editing application incompatible with the first email editing application utilizing an Answer Set Programming (ASP) model by:

extracting facts for the ASP model from the HTML email file;

determining rows or columns defining cells of the HTML email file utilizing ASP hard constraints defined by a first set of ASP atoms corresponding to the facts;

determining editable email component classes for the HTML fragments utilizing ASP soft constraints defined by ASP classification weights and a second set of ASP atoms corresponding to the facts; and generating the editable email components from the rows or columns defining the cells of the HTML email file and from the editable email component classes for the HTML fragment.

11. The non-transitory computer-readable medium of claim 10, further comprising instructions that, when executed by at least one processing device, cause the at least one processing device to perform operations comprising converting the HTML fragments to editable email components within the second email editing application based on the editable email component classes.

12. The non-transitory computer-readable medium of claim 10, wherein determining the rows or columns defining the cells of the HTML email file utilizing the ASP hard constraints comprises:

determining a set of row partition results utilizing the ASP hard constraints; and selecting rows defining the cells of the HTML email file utilizing an ASP objective function based on the set of row partition results.

13. The non-transitory computer-readable medium of claim 10, wherein determining editable email component classes for the HTML fragments comprises:

for a first ASP soft constraint, determining a first weight for a first editable email component class of a first email fragment of the HTML email file utilizing a first bodiless rule defined by a first ASP atom corresponding to a first email component feature and a first ASP classification weight; and for a second ASP soft constraint, determining a second weight for a second editable email component class of the first email fragment of the HTML email file utilizing a second bodiless rule defined by a second ASP atom corresponding to a second email component feature and a second ASP classification weight.

14. The non-transitory computer-readable medium of claim 13, wherein generating editable email components from the HTML email file further comprises selecting the first editable email component class for the first email fragment utilizing an ASP objective function based on the first weight for the first editable email component class and the second weight for the second editable email component class.

15. A system comprising:

one or more memory components; and one or more processing devices coupled to the one or more memory components, the one or more processing devices to perform operations comprising:

receiving a hypertext markup language (HTML) email file comprising HTML fragments generated utilizing a first email editing application; and generating editable email components from the HTML fragments for editing by a second email editing application incompatible with the first email editing application utilizing an Answer Set Programming (ASP) model by:

extracting facts for the ASP model from the HTML email file;

determining rows or columns defining cells of the HTML email file utilizing ASP hard constraints defined by a first set of ASP atoms corresponding to the facts;

determining editable email component classes for the HTML fragments utilizing ASP soft constraints defined by ASP classification weights and a second set of ASP atoms corresponding to the facts; and generating the editable email components from the rows or columns defining the cells of the HTML email file and from the editable email component classes for the HTML fragments.

16. The system of claim 15, wherein extracting the facts for the ASP model from the HTML email file further comprises at least one of:

determining the facts based on an embedded style sheet of the HTML email file, determining fragment width, height, or position from a browser rendering of the HTML email file, or extracting colors or fonts from the HTML email file utilizing a computer vision library.

17. The system of claim 15, wherein the HTML email file is generated utilizing the first email editing application and further comprising generating the editable email components from the HTML email file for editing by the second email editing application by:

identifying incompatible labels for the HTML fragments corresponding to the first email editing application from the HTML email file;

upon determining the editable email component classes, generating labels for the HTML fragments compatible with the second email editing application; and replacing the incompatible labels with labels compatible with the second email editing application to generate the editable email components.

18. The system of claim 15, wherein determining the rows or columns defining the cells of the HTML email file utilizing the ASP hard constraints comprises executing a row detection task of the ASP model by:

determining a set of row partition results utilizing the ASP hard constraints;

determining numbers of row partitions in the set of row partition results utilizing a head ASP atom; and selecting rows defining the cells of the HTML email file utilizing an ASP objective function based on the head ASP atom.

19. The system of claim 18, wherein determining the set of row partition results utilizing the ASP hard constraints comprises determining the set of row partition results by utilizing the ASP model to search for possible row partitions subject to the ASP hard constraints, wherein the ASP hard constraints comprise at least one of: a number of rows hard constraint, an email element overlap hard constraint, or an element cross-row duplication hard constraint.

20. The system of claim 15, wherein determining editable email component classes utilizing the ASP soft constraints comprises executing an element classification task of the ASP model by, for a first ASP soft constraint, determining a first weight for an editable email component class of an email fragment of the HTML email file utilizing a first bodiless rule defined by a first ASP atom corresponding to a first email component feature and a first ASP classification weight.

* * * * *